US010394083B2

(12) United States Patent
Mizusaki et al.

(10) Patent No.: US 10,394,083 B2
(45) Date of Patent: Aug. 27, 2019

(54) ORIENTED FILM, POLYMER, AND LIQUID CRYSTAL DISPLAY DEVICE

(71) Applicant: SHARP KABUSHIKI KAISHA, Sakai, Osaka (JP)

(72) Inventors: Masanobu Mizusaki, Sakai (JP); Hiroshi Tsuchiya, Sakai (JP); Yuko Teraoka, Sakai (JP); Tsuyoshi Okazaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/074,865

(22) PCT Filed: Jan. 31, 2017

(86) PCT No.: PCT/JP2017/003308
§ 371 (c)(1),
(2) Date: Aug. 2, 2018

(87) PCT Pub. No.: WO2017/135216
PCT Pub. Date: Aug. 10, 2017

(65) Prior Publication Data
US 2019/0049796 A1    Feb. 14, 2019

(30) Foreign Application Priority Data

Feb. 3, 2016    (JP) .................................. 2016-019160

(51) Int. Cl.
*G02F 1/1337*    (2006.01)
*C08G 77/38*    (2006.01)
(Continued)

(52) U.S. Cl.
CPC ........ *G02F 1/133711* (2013.01); *C08G 77/38* (2013.01); *C09K 19/2014* (2013.01);
(Continued)

(58) Field of Classification Search
CPC ........ Y10T 428/1005; Y10T 428/1014; C08G 77/38; C09K 19/406; C09K 19/408; C09K 19/56; C09K 19/2014
See application file for complete search history.

(56) References Cited

U.S. PATENT DOCUMENTS 6,933,345 B1 * 8/2005 Lichtenhan ............ B82Y 30/00
525/101
2006/0222785 A1 * 10/2006 Kurosawa ......... G02F 1/133711
428/1.23

FOREIGN PATENT DOCUMENTS

JP    2004-341165 A    12/2004
JP    2004341165 A  *  12/2004
(Continued)

OTHER PUBLICATIONS

Glycidyl group, data sheet [online], ChEBI, European Bioinfomatics Institute, Jan. 30, 2008 [retrieved on Mar. 22, 2019]. Retrieved from the Internet:<URL:https://www.ebi.ac.uk/chebi/searchId.do?chebild=24366> (Year: 2008).*
(Continued)

*Primary Examiner* — Sophie Hon
(74) *Attorney, Agent, or Firm* — ScienBiziP, P.C.

(57) ABSTRACT

The present invention aims to provide a liquid crystal display device in which image sticking and stains are sufficiently reduced. The present invention relates to an alignment film including: a polymer, wherein the polymer is a polysiloxane or a polyvinyl and contains a silsesquioxane group. The present invention also relates to a polymer for use in the alignment film, the polymer containing a silsesquioxane group. The present invention also relates to a liquid crystal display device including: the alignment film; a pair of substrates; and a liquid crystal layer disposed between the substrates, wherein the alignment film is disposed between at least one of the substrates and the liquid crystal layer.

16 Claims, 4 Drawing Sheets

(51) Int. Cl.
*C09K 19/56* (2006.01)
*G02F 1/1333* (2006.01)
*C09K 19/20* (2006.01)
*C09K 19/40* (2006.01)
*C09K 19/04* (2006.01)

(52) U.S. Cl.
CPC ............ *C09K 19/408* (2013.01); *C09K 19/56* (2013.01); *G02F 1/1337* (2013.01); *G02F 1/133345* (2013.01); *G02F 1/133788* (2013.01); *C09K 2019/0444* (2013.01); *C09K 2019/2035* (2013.01); *G02F 1/133723* (2013.01); *G02F 2001/133773* (2013.01); *Y10T 428/1014* (2015.01)

(56) References Cited

FOREIGN PATENT DOCUMENTS

| | | | |
|---|---|---|---|
| JP | 2007-086287 A | 4/2007 | |
| JP | 2008-239690 A | 10/2008 | |
| WO | WO-2009069724 A1 * | 6/2009 | ............ C08G 77/38 |

OTHER PUBLICATIONS

Won-Jin Yoon et al., "Photopolymerization of Reactive Amphiphiles: Automatic and Robust Vertical Alignment Layers of Liquid Crystals with a Strong Surface Anchoring Energy", Macromolecules, 2016, 49 (1), pp. 23-29.

* cited by examiner

— Polymer main chain
● Low-molecular-weight compound containing SSQ group

ORIENTED FILM, POLYMER, AND LIQUID CRYSTAL DISPLAY DEVICE

TECHNICAL FIELD

The present invention relates to alignment films, polymers, and liquid crystal display devices. The present invention in particular relates to a polysiloxane-based alignment film, a vinyl-based alignment film, a polymer for use in these alignment films, and a liquid crystal display device including at least one of these alignment films.

BACKGROUND ART

Display devices such as liquid crystal display devices have rapidly spread in recent years and are used not only for televisions but also for a wide variety of devices such as electronic book readers, digital photo frames, industrial appliances, personal computers (PCs), tablet PCs, and smartphones. These devices are required to have various properties for the respective uses, and various liquid crystal display modes are developed.

Examples of the liquid crystal display modes include modes in which liquid crystal molecules are aligned in a direction substantially parallel to the main surfaces of the substrates when no voltage is applied (hereinafter, also referred to as horizontal alignment modes) such as the in-plane switching (IPS) mode and the fringe field switching (FFS) mode. Examples of the liquid crystal display modes also include modes in which liquid crystal molecules are aligned in a direction substantially perpendicular to the main surfaces of the substrates when no voltage is applied (hereinafter, also referred to as vertical alignment modes) such as the vertical alignment (VA) mode. In order to achieve such alignment control of liquid crystal molecules, use of an alignment film is proposed.

Patent Literature 1, for example, discloses the introduction of a specific silsesquioxane (SSQ) low-molecular-weight additive into a varnish for forming a liquid crystal alignment film containing a solvent and a polymer component including a polyamic acid, a soluble polyimide, a polyamide, a polyamideimide, or a mixture of two or more thereof, so as to increase the rubbing resistance and storage stability of the varnish Patent Literature 2, for example, discloses the introduction of a specific silsesquioxane (SSQ) crosslinking agent into an alignment film including a polyamic acid and a polyimide so as to crosslink the polyamic acid and polyimide to increase the storage stability and rubbing resistance of the alignment film.

CITATION LIST

Patent Literature

Patent Literature 1: JP 2004-341165 A
Patent Literature 2: JP 2007-86287 A

SUMMARY OF INVENTION

Technical Problem (Issues of Polysiloxane and Polyvinyl as Alignment Film Material)

Conventionally used polyimides and polyamic acids tend to have a relatively wide molecular weight distribution (for example, 5 or greater) as they are synthesized by condensation polymerization. As a result, alignment films formed from them have relatively large irregularities, leading to low alignment controllability. Such low alignment controllability makes it difficult to control the pre-tilt angle and alignment azimuth of the liquid crystal molecules, and thus may make it impossible to achieve a high contrast ratio even if the photo-alignment technique is used to avoid uneven rubbing. In polysiloxanes and polyvinyls, as compared with the polyimides and polyamic acids, the polymer chains have low rigidity and high flexibility. Alignment films formed from polysiloxanes or polyvinyls thus achieve high alignment uniformity. Polysiloxanes and polyvinyls, however, easily dissolve into the liquid crystal layer because they have highly flexible polymer chains that allow them to change their conformation according to the medium, and also because polysiloxanes have a relatively low molecular weight as they are typically polymerized by ring-opening polymerization. The polysiloxane or polyvinyl dissolved into the liquid crystal layer partially disturbs the alignment of the liquid crystal molecules in the liquid crystal layer in the display area. Polymer materials with low flexibility, such as polyimides and polyamic acids, are relatively less likely to dissolve into the liquid crystal layer because the liquid crystal molecules are aligned in the liquid crystal layer.

FIG. 4 is a schematic view of a polysiloxane containing an ester group in a side chain. In FIG. 4, $A^1$s are the same as or different from each other and each a direct bond or a divalent linking group; $A^2$s are the same as or different from each other and each a hydrogen atom or a monovalent organic group; X is a hydrogen atom, an alkoxy group, or a hydroxy group; and p represents the degree of polymerization and is an integer of 1 or greater.

FIG. 5 is a schematic view of ion generation by ester group decomposition in a polysiloxane containing an ester group in a side chain. FIG. 6 is a schematic view of radical generation by cinnamate group decomposition in a polysiloxane containing a cinnamate group as an example of a photo-aligning functional group in a side chain. When a polymer such as a polysiloxane has a photo-aligning functional group or a vertically aligning group other than the photo-aligning functional group introduced in a side chain, image stains or image sticking may occur due to the following factors: (1) the generation of ions by the decomposition of an ester group in the vertically aligning group or in a spacer linking group between the vertically aligning group and the polysiloxane main chain, due to heat (for example, see FIG. 5); (2) the generation of radicals by the decomposition of the photo-aligning functional group (e.g., a cinnamate group, a chalcone group, an azobenzene group, a coumarin group, a stilbene group, or a tolane group) due to irradiation with light (e.g., visible light, ultraviolet light) (for example, see FIG. 6); (3) the generation of radicals by the decomposition of an ester group, an amide group, and an ether group and the generation of ions derived from the radicals; and (4) the oxidation of the generated radicals by dissolved oxygen in the liquid crystal, leading to the generation of activated radicals and ions.

The present invention was made in view of the situation in the art and aims to provide a liquid crystal display device in which image sticking and stains are sufficiently reduced.

Solution to Problem

The present inventors made various studies on liquid crystal display devices to arrive at the introduction of a silsesquioxane (SSQ) group into a polymer constituting an alignment film, such as a polysiloxane, by a chemical bond.

The present inventors arrived at the solution of the above problems owing to the above configuration, completing the present invention.

One aspect of the present invention may be an alignment film including: a polymer, wherein the polymer is a polysiloxane or a polyvinyl and contains a silsesquioxane group.

Another aspect of the present invention may be a polymer for use in the alignment film of the present invention, the polymer containing a silsesquioxane group.

Still another aspect of the present invention may be a liquid crystal display device including: the alignment film of the present invention; a pair of substrates; and a liquid crystal layer disposed between the substrates, wherein the alignment film is disposed between at least one of the substrates and the liquid crystal layer. The pair of substrates herein means a combination of an "upper substrate" and a "lower substrate".

In the invention disclosed in Patent Literature 1, SSQ is added as a low-molecular-weight additive to an alignment film for rubbing including a polyimide, a polyamic acid, a polyamide, or a polyamideimide. The aim of the invention disclosed in Patent Literature 1 is to prevent the degradation of the alignment film due to rubbing treatment, and the SSQ is added as a low-molecular-weight additive to improve the film strength. One aspect of the present invention is an alignment film including a polysiloxane or a polyvinyl. An SSQ group is introduced to the polysiloxane or the polyvinyl by a chemical bond with the aim of reducing the solubility of the highly flexible polysiloxane or polyvinyl in liquid crystal.

In the invention disclosed in Patent Literature 1, the polyimide, polyamic acid, polyamide, and polyamideimide are all synthesized by condensation polymerization. They thus have a large molecular weight distribution, giving the problem of alignment uniformity. The invention disclosed Patent Literature 1 thus fails to achieve a sufficient contrast ratio.

In the invention disclosed in Patent Literature 2, an alignment film including a polyamic acid and a polyimide is crosslinked with a crosslinking agent containing an SSQ group. One aspect of the present invention is an alignment film including a polysiloxane or a polyvinyl. While an SSQ group is introduced into the polymer by a chemical bond, the side chain containing the SSQ group does not serve as a crosslinking site (the SSQ group itself does not crosslink the polymer chains). In the invention disclosed in Patent Literature 2, the polyamic acid and the polyimide are crosslinked with the crosslinking agent containing an SSQ group to increase the film strength with the aim of preventing the degradation of the alignment film due to rubbing treatment. In one aspect of the present invention, while the SSQ group is chemically bonded to the polysiloxane or the polyvinyl with the aim of reducing the solubility of the highly flexible polysiloxane or polyvinyl in liquid crystal, the side chain containing the SSQ group is not used for crosslinking.

Advantageous Effects of Invention

The alignment film of the present invention can sufficiently reduce image sticking and stains in a liquid crystal display device. The polymer of the present invention, when used as an alignment film material, can sufficiently reduce image sticking and stains in a liquid crystal display device. In the liquid crystal display device of the present invention, image sticking and stains are sufficiently reduced.

DESCRIPTION OF EMBODIMENTS

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

The photo-aligning functional group herein may be any functional group that generates a radical by absorbing light at a wavelength within the wavelength range of ultraviolet light and/or visible light.

A mode in which liquid crystal molecules are aligned in a direction substantially parallel to the main surfaces of the substrates when no voltage is applied is also referred to as a horizontal alignment mode. The phrase "substantially parallel" means, for example, the pre-tilt angle of liquid crystal molecules is 0° or greater and 5° or smaller relative to the main surfaces of the substrates. A mode in which liquid crystal molecules are aligned in a direction substantially perpendicular to the main surfaces of the substrates when no voltage is applied is also referred to as a vertical alignment mode. The phrase "substantially perpendicular" means, for example, the pre-tilt angle of liquid crystal molecules is 85° or greater and 90° or smaller. The term "room temperature" herein means a temperature of 15° C. or higher and 40° C. or lower.

The chemical bond herein usually means a covalent bond.

The present invention is applicable to both a horizontal alignment mode liquid crystal display device and a vertical alignment mode liquid crystal display device.

Figure 1:
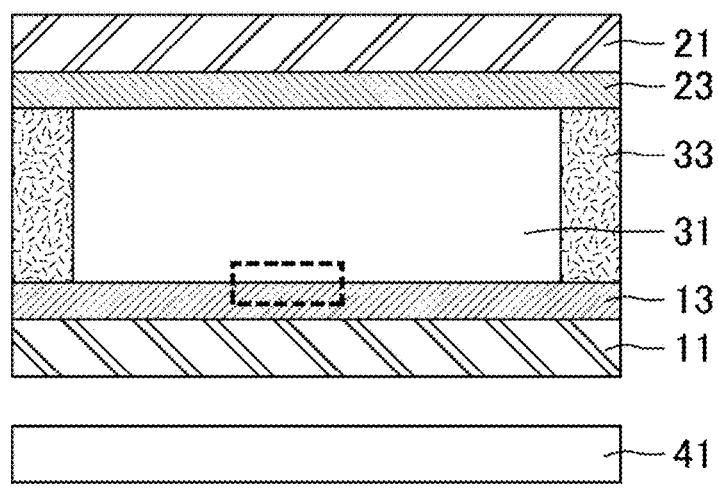
FIG. 1 is a schematic cross-sectional view of the liquid crystal display device of the present invention.

FIG. 1 is a schematic cross-sectional view of the liquid crystal display device of the present invention. As illustrated in FIG. 1, the liquid crystal display device includes a lower glass substrate 11, an upper glass substrate 21 facing the lower glass substrate 11, a liquid crystal layer 31 and a seal 33 disposed between the substrates, and alignment films 13 and 23. The alignment film 13 is disposed between the lower glass substrate 11 and the liquid crystal layer 31. The alignment film 23 is disposed between the upper glass substrate 21 and the liquid crystal layer 31. The seal 33 encloses the liquid crystal layer 31. The liquid crystal display device further includes a backlight 41 below (on the back surface side of) the lower glass substrate 11. The liquid crystal display device may further include a pair of polarizers, one of which is on the surface of the lower glass substrate 11 opposite to the liquid crystal layer 31 and the other of which is on the surface of the upper glass substrate 21 opposite to the liquid crystal layer 31.

The liquid crystal display device of the present invention includes components such as thin film transistor elements appropriately disposed on the lower glass substrate 11 which serves as a support substrate. The liquid crystal display panel of the present invention includes, for example, slit pixel electrodes on part of an insulating layer covering the components such as thin film transistor elements and a common electrode on the upper glass substrate 21 as a support substrate. The material of the pixel electrodes and the common electrode to be favorably used is indium tin oxide (ITO) or indium zinc oxide (IZO). The liquid crystal display device of the present invention further includes components such as a color filter layer appropriately disposed on the upper glass substrate 21 (the display device may include a black matrix on the same layer). The color filter layer may be disposed on the lower glass substrate 11 instead of the upper glass substrate 21.

Figure 2:
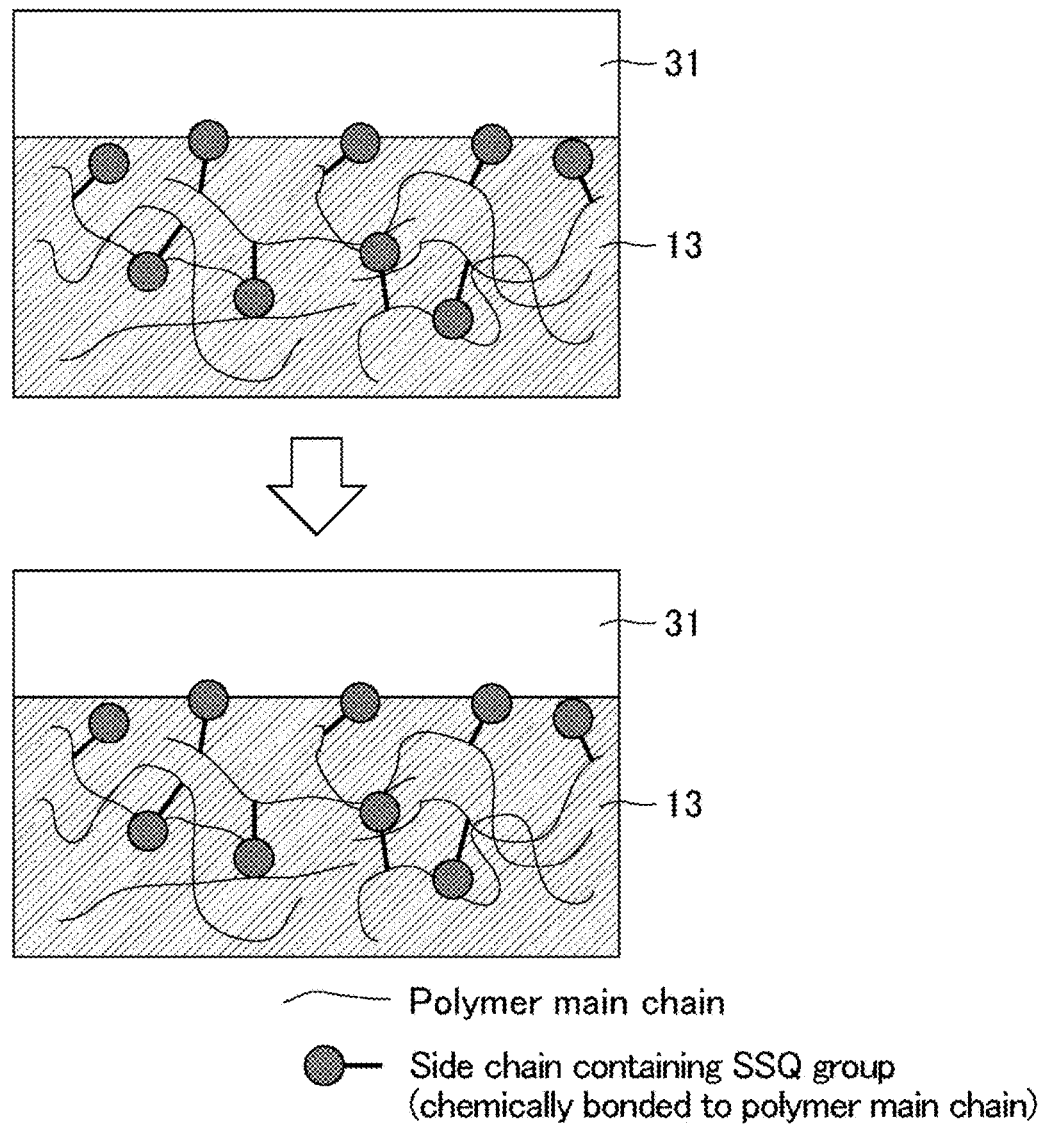
FIG. 2 includes enlarged views of a portion indicated by dashed lines in FIG. 1, illustrating a long-term change of the portion.
Figure 3:
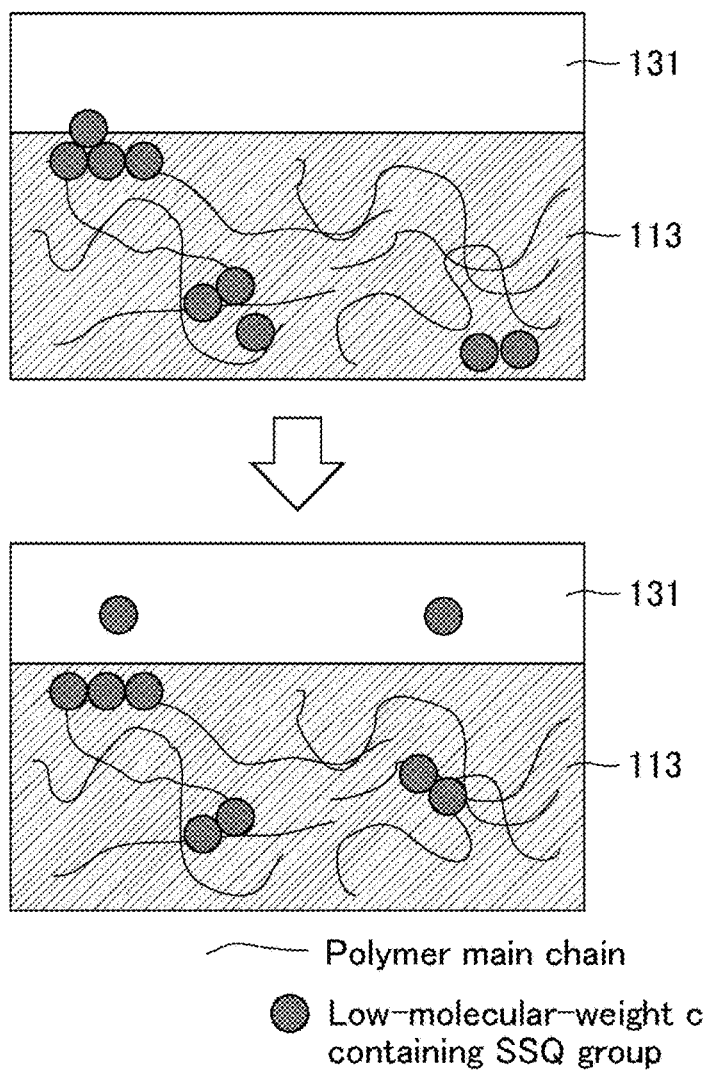
FIG. 3 includes views illustrating a long-term change of a liquid crystal display device in which a low-molecular-weight compound is added to an alignment film material.
Figure 4:
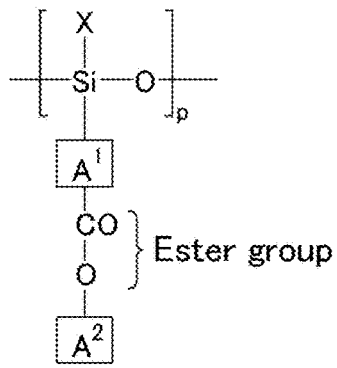
FIG. 4 is a schematic view of a polysiloxane containing an ester group in a side chain.
Figure 5:
FIG. 5 is a schematic view of ion generation by ester group decomposition in a polysiloxane containing an ester group in a side chain.
Figure 6:
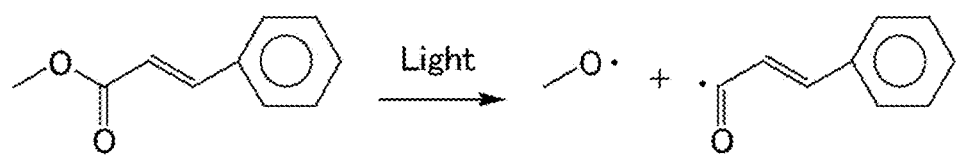
FIG. 6 is a schematic view of radical generation by cinnamate group decomposition in a polysiloxane containing a cinnamate group as an example of a photo-aligning functional group in a side chain.

FIG. 2 includes enlarged views of a portion indicated by dashed lines in FIG. 1, illustrating a long-term change of the portion. FIG. 3 includes views illustrating a long-term change of a liquid crystal display device in which a low-molecular-weight compound is added to an alignment film material.

In the case of the present invention, as illustrated in FIG. 2, SSQ groups are chemically bonded to the polymer in the alignment film 13. As a result, the states of the alignment film 13 and the liquid crystal layer 31 show no change even for a long time.

In cases where a low-molecular-weight compound containing an SSQ group is added to the alignment film material, long lapse of time may possibly cause defects such as coagulation of the low-molecular-weight compound, uneven distribution of the low-molecular-weight compound on the surface of the alignment film 113, and dissolution of the low-molecular-weight compound which is easily soluble in liquid crystal into the liquid crystal layer 131 (for example, see FIG. 3).

In the present invention, a polymer into which an SSQ group is introduced by a chemical bond is used as an alignment film material. The SSQ group may be contained in a main chain or a side chain of the polymer. From the viewpoint of ease of polymer preparation, the SSQ group is preferably contained in a side chain. This will be described in detail below.

For example, the amount of a monomer unit having an SSQ group to be introduced may fall within the range of 1 to 50 mol % relative to 100 mol % of the monomer units of the whole polymer.

First Embodiment

In a first embodiment of the present invention, an SSQ group is introduced into a polysiloxane or a polyvinyl by a chemical bond to prevent the polysiloxane or the polyvinyl from dissolving into the liquid crystal layer.

In the first embodiment, the side chain of the polysiloxane or the polyvinyl may appropriately be a side chain used as a side chain of a polymer constituting an alignment film. Examples thereof include photo-aligning side chains and vertically or horizontally aligning side chains other than the photo-aligning side chains. The side chain may include one or more side chains selected from the group consisting of a photo-aligning side chain, a vertically aligning side chain other than the photo-aligning side chain, and a horizontally aligning side chain other than the photo-aligning side chain.

The SSQ group has a steric structure, and is thus more rigid than linear polysiloxanes or polyvinyls. Thus, the introduction of an SSQ group into the highly flexible polysiloxane or polyvinyl by a chemical bond significantly reduces the solubility of the polysiloxane or the polyvinyl in liquid crystal. This sufficiently reduces the radical generation and ion generation caused by the factors (1) to (4) described above. The SSQ group is spherical and contains the inorganic element Si, so that it is less likely to interact with liquid crystal. The SSQ group itself thus typically does not control the alignment as other functional groups (for example, steroid functional groups induce vertical alignment).

In horizontal alignment modes such as the IPS/FFS mode, the introduction of an SSQ group into part of the side chains of the polysiloxane reduces alignment-controlling force because the interaction between the inorganic element Si and a liquid crystal compound is weak. This reduces the threshold voltage of liquid crystal response (Vth), resulting in an improved rise response speed of a liquid crystal display (LCD). In vertical alignment modes, the introduction of a rigid SSQ group into part of the side chains of the polysiloxane increases the alignment stability and reduces the change in the tilt angle. Also in the polyvinyl, which has a highly flexible main chain as the polysiloxane, the introduction of an SSQ group into a side chain can reduce the solubility in the liquid crystal layer and thus improve reliability. Moreover, also in a blended alignment film containing a polysiloxane or a polyvinyl and a polyimide or a polyamic acid, the introduction of an SSQ group into a side chain of the polysiloxane or the polyvinyl improves the reliability and the rise response speed in the IPS/FFS mode as described above.

The polymer having a main chain derived from a polysiloxane according to the first embodiment is preferably a polymer represented by the following formula (1):

[Chem. 1]

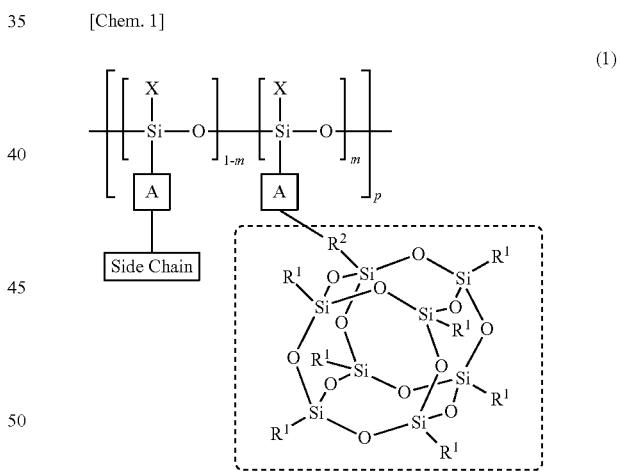

wherein Xs are each a hydrogen atom, a methyl group, a methoxy group, an ethoxy group, or a hydroxy group; m represents the amount of a monomer unit having an SSQ group to be introduced, and is greater than 0 and not greater than 1, preferably 0.05 or greater, more preferably 0.3 or greater, and m is preferably not greater than 0.5; p represents the degree of polymerization and is an integer of 1 or greater, preferably 10 or greater; Side Chains are the same as or different from each other and each a photo-aligning side chain or a vertically or horizontally aligning side chain other than the photo-aligning side chain; A's are the same as or different from each other and each a direct bond or a divalent organic group; $R^1$s are the same as or different from each other and each a monovalent organic group; and $R^2$ is a direct bond or a divalent linking group. In the above formula, the portion surrounded by the dashed line is an SSQ group. Preferred embodiments of Side Chain are the same as those of Side Chain in the formula (8) and the formula (9), described later.

The polymer having a main chain derived from a polyvinyl according to the first embodiment is preferably a polymer represented by the following formula (2):

[Chem. 2]

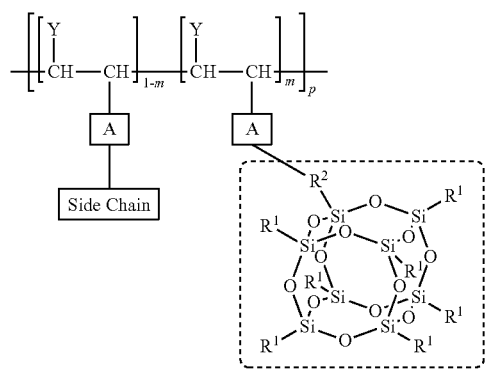

(2)

wherein Ys are each a hydrogen atom, a methyl group, or an ethyl group; m represents the amount of a monomer unit having an SSQ group to be introduced, and is greater than 0 and not greater than 1, preferably 0.05 or greater, more preferably 0.3 or greater, and m is preferably not greater than 0.5; p represents the degree of polymerization and is an integer of 1 or greater, preferably 10 or greater; Side Chains are the same as or different from each other and each a photo-aligning side chain or a vertically or horizontally aligning side chain other than photo-aligning side chain; A's are the same as or different from each other and each a direct bond or a divalent organic group; $R^1$s are the same as or different from each other and each a monovalent organic group; and $R^2$ is a direct bond or a divalent linking group. In the above formula, the portion surrounded by the dashed line is an SSQ group.

More specific examples of the structure of the polymer having a main chain derived from a polysiloxane according to the first embodiment are preferably those represented by the following formula (3), formula (4), or formula (5).

[Chem. 3]

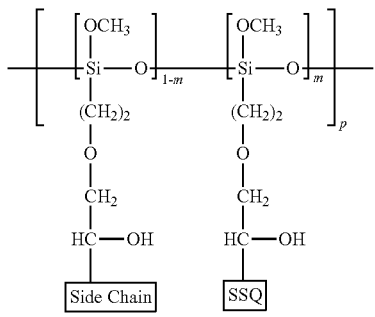

(3)

[Chem. 4]

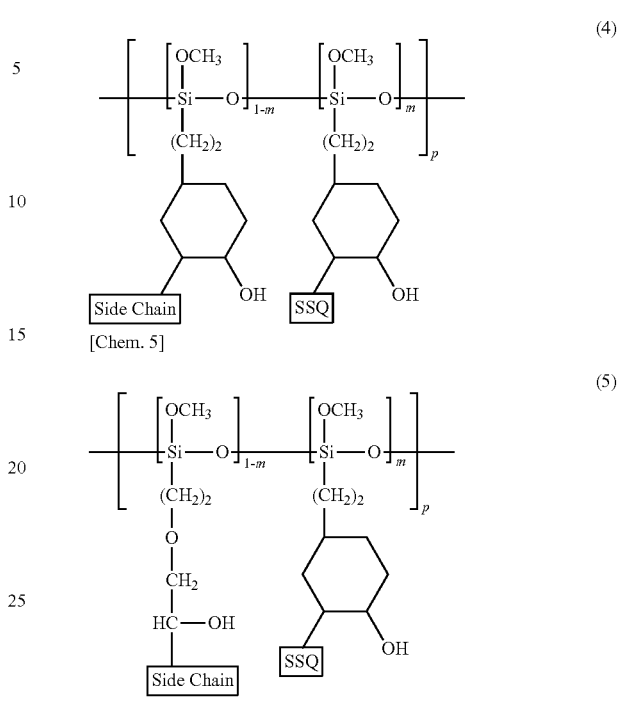

(4)

[Chem. 5]

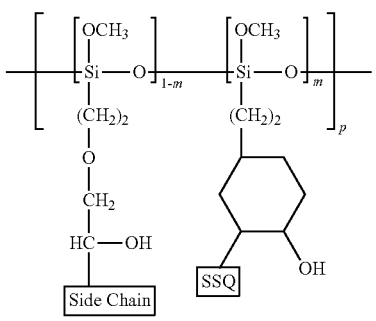

(5)

In the formulae (3) to (5), SSQ represents the SSQ group in the formula (1); m, p, and Side Chain are as described in the formula (1).

More specific examples of the structure of the polymer having a main chain derived from a polyvinyl are preferably those represented by the following formula (6).

[Chem. 6]

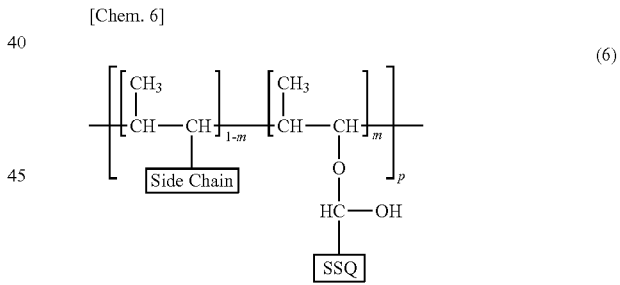

(6)

In the formula (6), SSQ represents the SSQ group in the formula (2); m, p, and Side Chain are as described in the formula (2).

Suitable examples of the divalent organic group for A in the formula (1) or (2) include those represented by the following formula (7-1) to formula (7-9).

[Chem. 7]

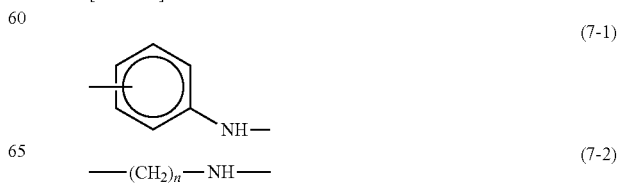

(7-1)

(7-2)

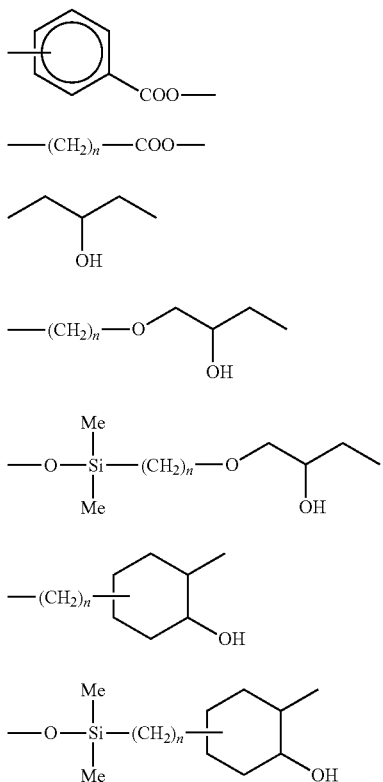

(7-3)
(7-4)
(7-5)
(7-6)
(7-7)
(7-8)
(7-9)

In the formulae (7-1) to (7-9), Me is a methyl group; and n is an integer of 0 to 30, preferably 1 to 20, more preferably 1 to 5.

The alignment film of the first embodiment of the present invention may further contain, in addition to the polysiloxane or polyvinyl containing an SSQ group, a polymer (hereinafter also referred to as a second polymer) different from a polysiloxane or a polyvinyl. The amount of the polysiloxane or polyvinyl containing an SSQ group is preferably 1% by mass or more, more preferably 3% by mass or more, still more preferably 5% by mass or more in 100% by mass of the polymers in the alignment film. The upper limit of the amount of the polymer containing an SSQ group is not limited, and may be 100% by mass.

Suitable examples of the second polymer include polyamic acids represented by the following formula (8) and polyimide structures represented by the following formula (9).

[Chem. 8]

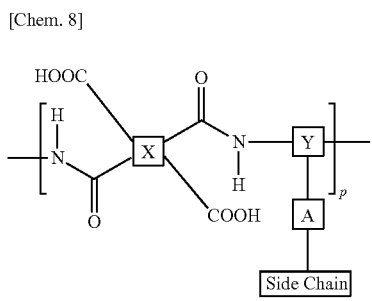

(8)

[Chem. 9]

(9)

In each of the formula (8) and the formula (9), p represents the degree of polymerization and is an integer of 1 or greater, preferably 10 or greater; and A represents a direct bond or a divalent organic group.

In each of the formula (8) and the formula (9), X is preferably a tetravalent group represented by any of the following formulae (10-1) to (10-12). These groups can be used for both horizontal alignment films, which align liquid crystal molecules substantially parallel to the film surfaces, and vertical alignment films, which align liquid crystal molecules substantially perpendicular to the film surfaces.

[Chem. 10]

(10-1)

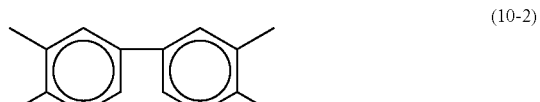
(10-2)

(10-3)

(10-4)

(10-5)

(10-6)

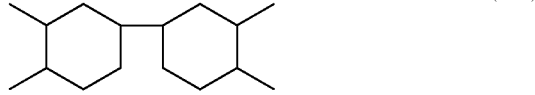
(10-7)

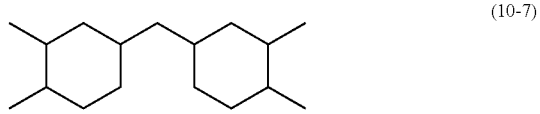
(10-8)

-continued

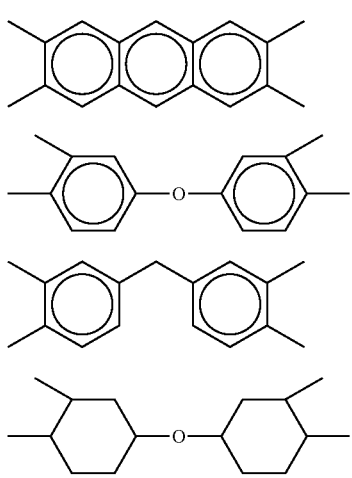

(10-9)

(10-10)

(10-11)

(10-12)

In each of the formula (8) and the formula (9), X may be a tetravalent group represented by any of the following formulae (11-1) to (11-4). These groups can be used for both horizontal alignment films, which align liquid crystal molecules substantially parallel to the film surfaces, and vertical alignment films, which align liquid crystal molecules substantially perpendicular to the film surfaces.

[Chem. 11]

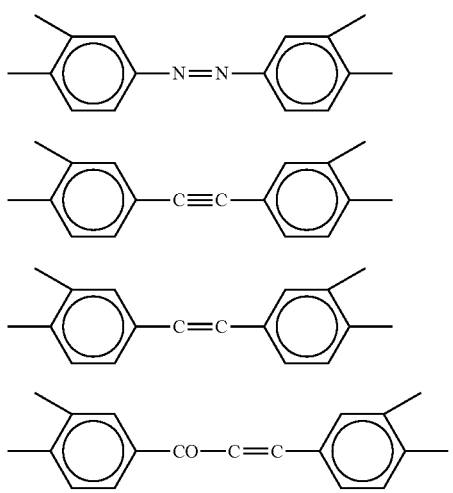

(11-1)

(11-2)

(11-3)

(11-4)

In each of the formula (8) and the formula (9), Y may be a trivalent group represented by any of the following formulae (12-1) to (12-16). These groups can be used for both horizontal alignment films and vertical alignment films.

[Chem. 12]

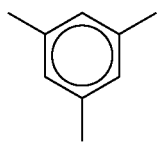

(12-1)

-continued

(12-2)

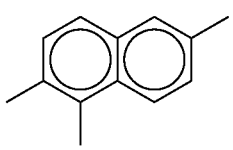

(12-3)

(12-4)

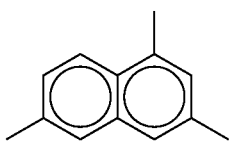

(12-5)

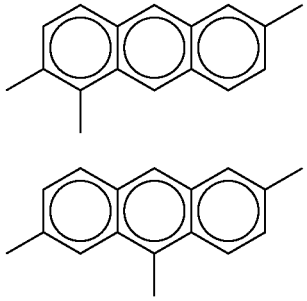

(12-6)

(12-7)

(12-8)

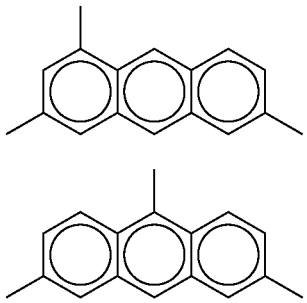

(12-9)

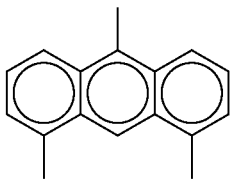

(12-10)

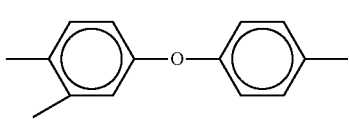

(12-11)

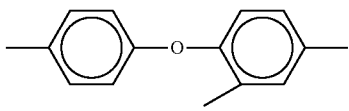

(12-12)

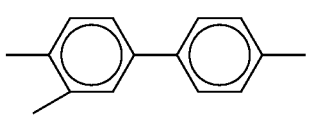

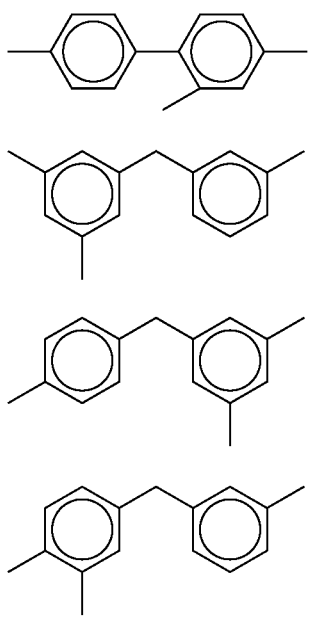

In each of the formula (8) and the formula (9), Y may be a trivalent group represented by any of the following formulae (13-1) to (13-8). These groups can be used for any of photo-alignment films, horizontal alignment films other than the photo-alignment films, and vertical alignment films other than the photo-alignment films.

[Chem. 13]

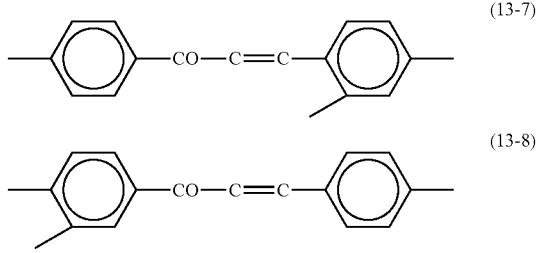

In each of the formula (8) and the formula (9), at least part of Side Chains is preferably a photo-aligning functional group, and a vertically or horizontally aligning functional group other than the photo-aligning functional group may separately be introduced thereinto. Side Chains each may be a monovalent group represented by any of the following formulae (14-1) to (14-8). These groups are for horizontal alignment films.

[Chem. 14]

—H (14-1)

—CH$_3$ (14-2)

—C$_2$H$_5$ (14-3)

—CF$_3$ (14-4)

(14-5)

(14-6)

(14-7)

(14-8)

In each of the formula (8) and the formula (9), Side Chains each may be a monovalent group represented by any of the following formulae (15-1) to (15-7). These groups are for vertical alignment films.

[Chem. 15]

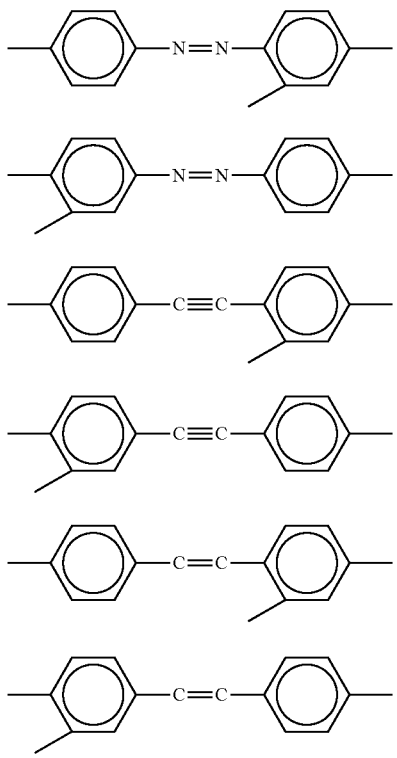

(15-1)

-continued (15-2)

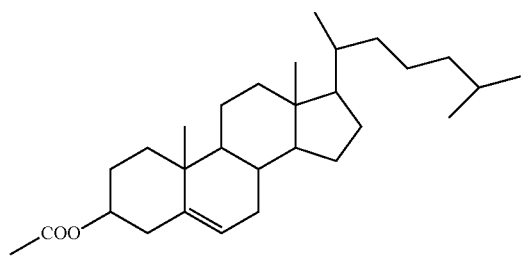

(15-3)

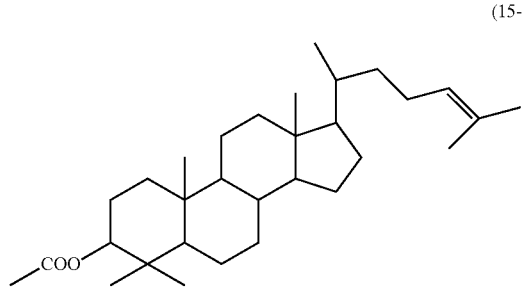

(15-4)

-continued (15-5)

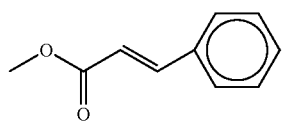

(15-6)

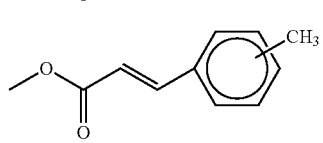

(15-7)

In each of the formula (8) and the formula (9), Side Chains each may be a monovalent group represented by the following formula (16-1) or (16-2). These groups are for horizontal photo-alignment films.

[Chem. 16]

(16-1)

(16-2)

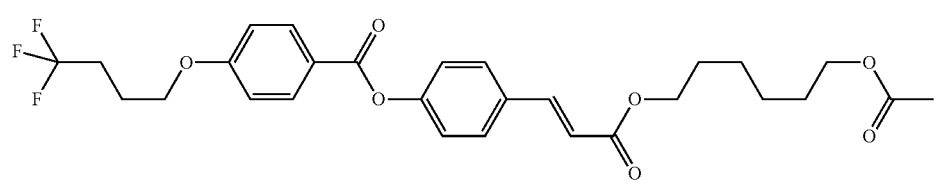

In each of the formula (8) and the formula (9), Side Chains each may be a monovalent group represented by any of the following formulae (17-1) to (17-21). These groups are for vertical photo-alignment films.

[Chem. 17-1]

(17-1)

(17-2)

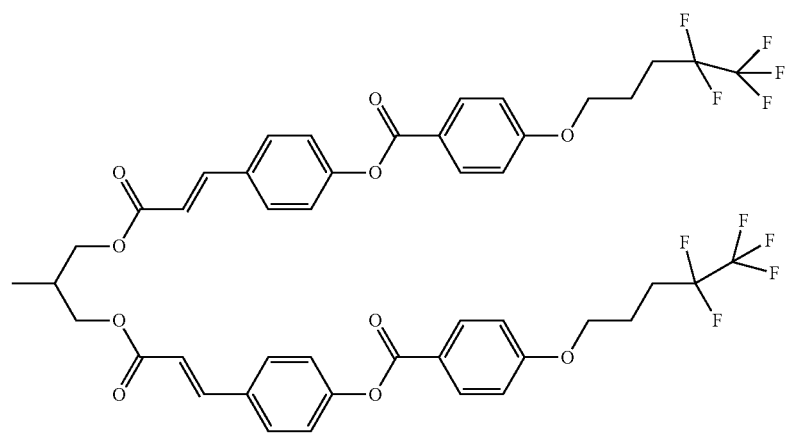

-continued
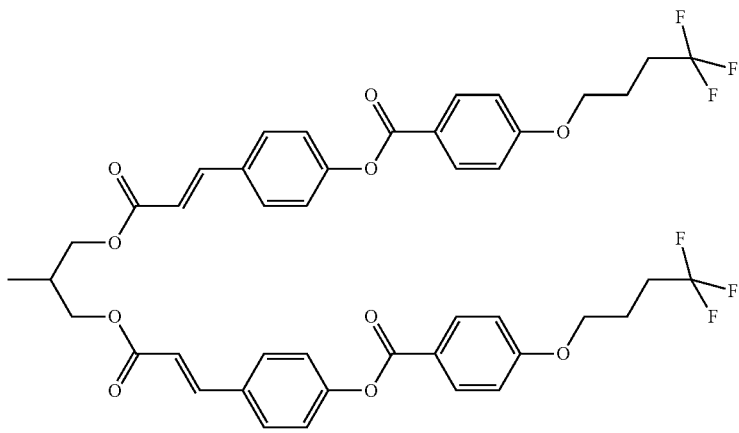
(17-3)
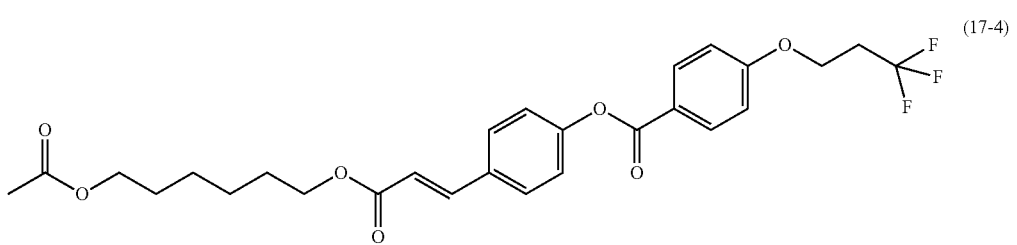
(17-4)
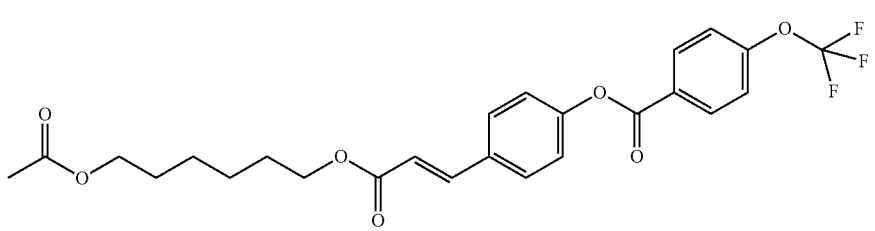
(17-5)
[Chem. 17-2]
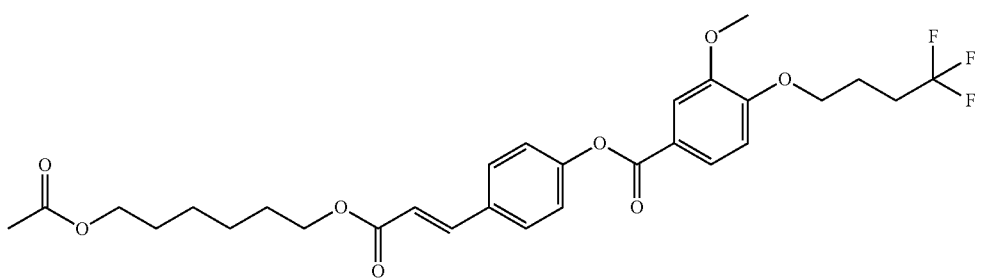
(17-6)
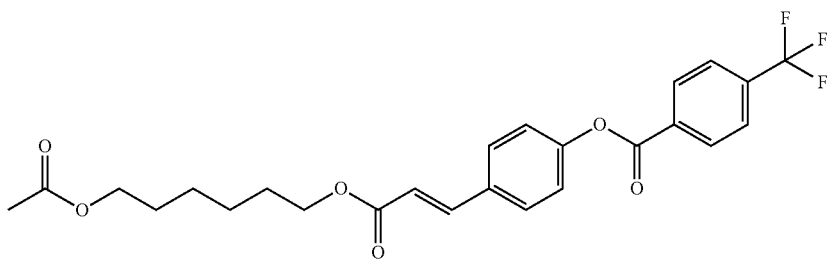
(17-7)

-continued
(17-8)
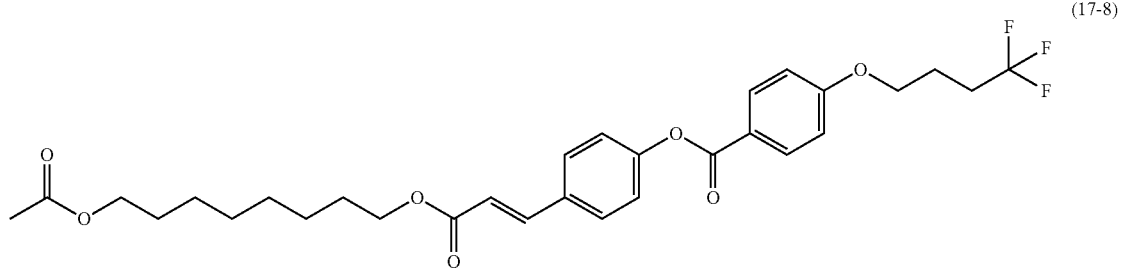
(17-9)
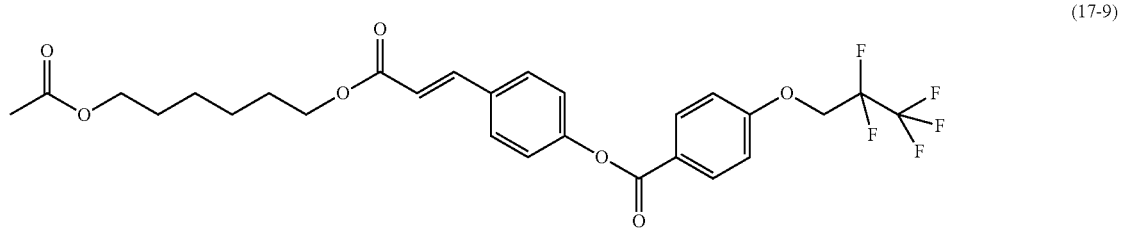
(17-10)
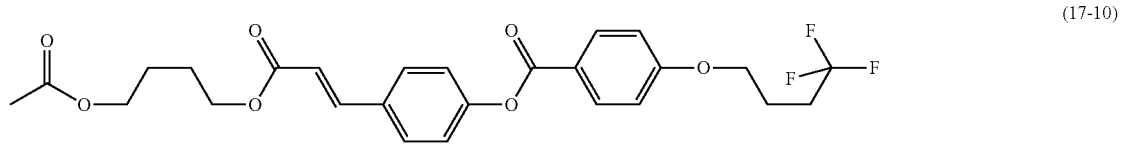
(17-11)
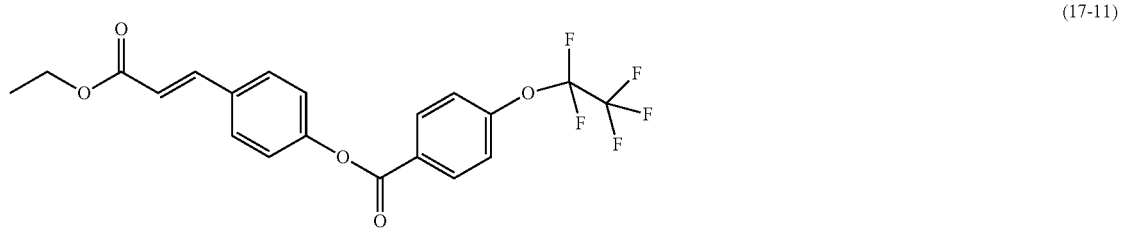
[Chem. 17-3]
(17-12)
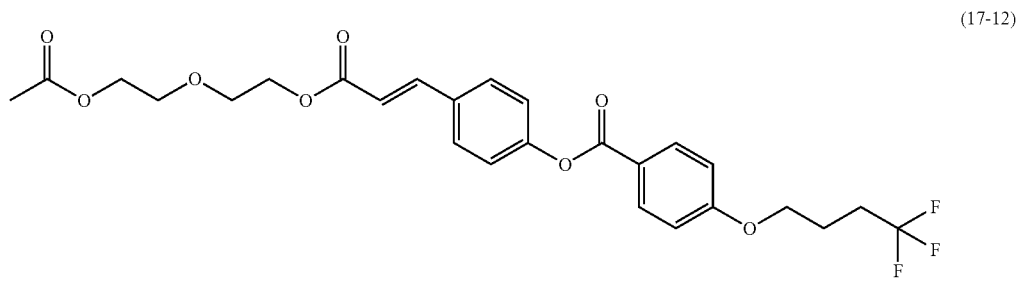
(17-13)
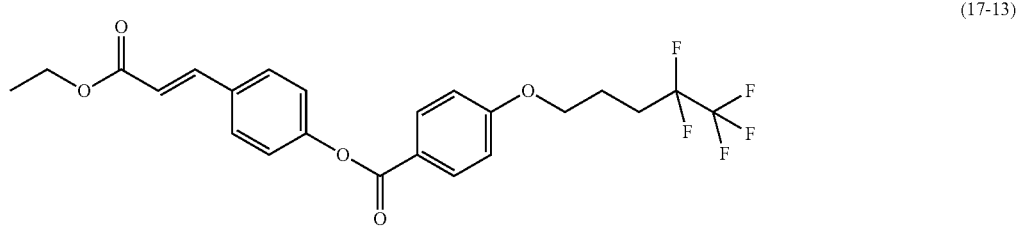
(17-14)
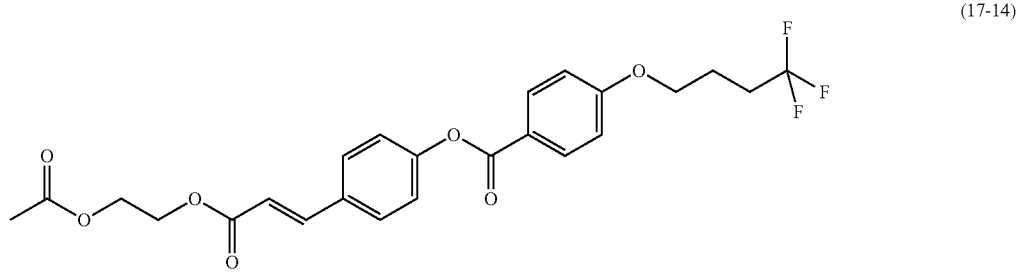

-continued
(14-15)
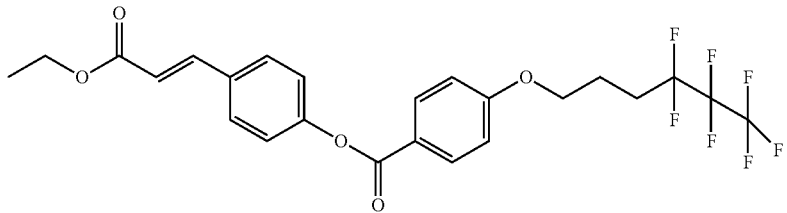
(17-16)
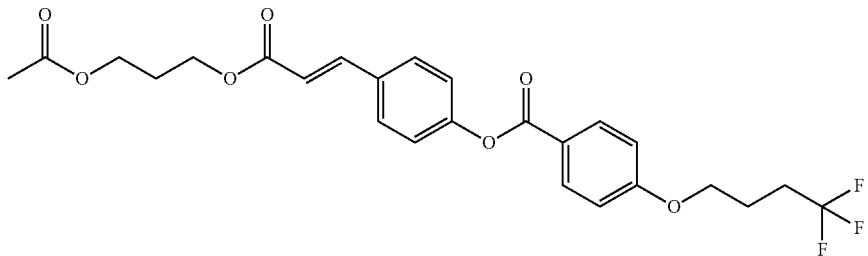
(17-17)
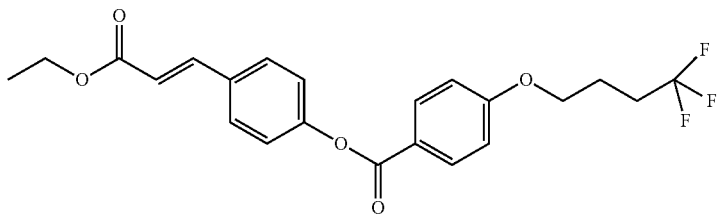
[Chem. 17-4]
(17-18)
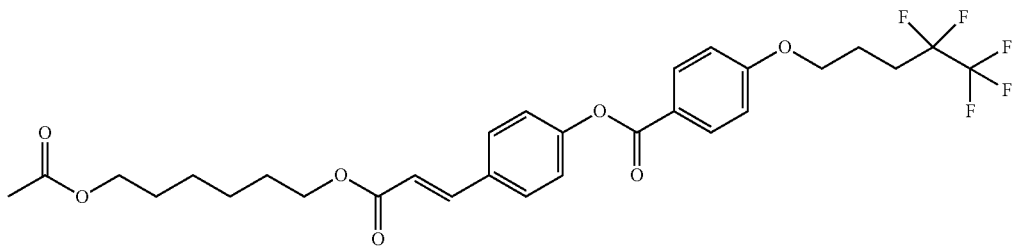
(17-19)
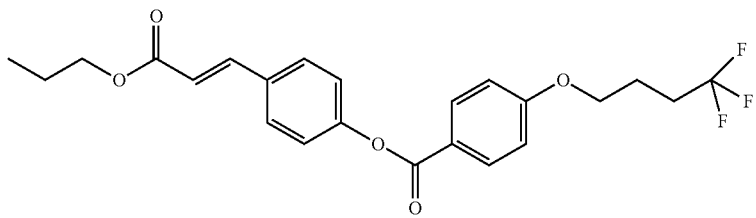
(17-20)
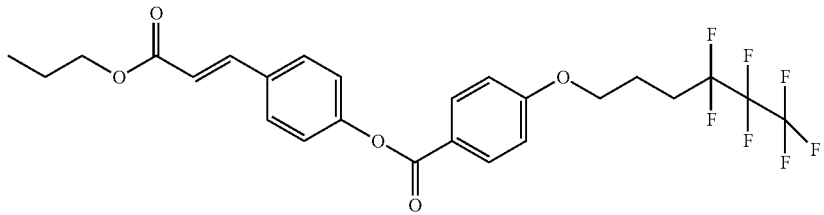

-continued

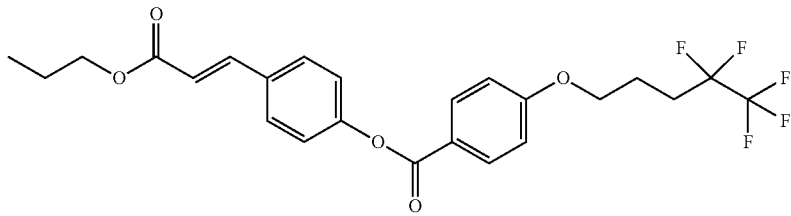

(17-21)

In the following, examples corresponding to the embodiment will be described.

Examples 1 to 6 and Comparative Example 1: Horizontal Alignment/IPS Mode

A 10:90 (mass ratio) blended polymer of the following polymers was used as an alignment film material: a polysiloxane copolymer represented by the following formula containing a monomer unit having an SSQ group in a side chain; and a polyamic acid-based polymer.

[Chem. 18]

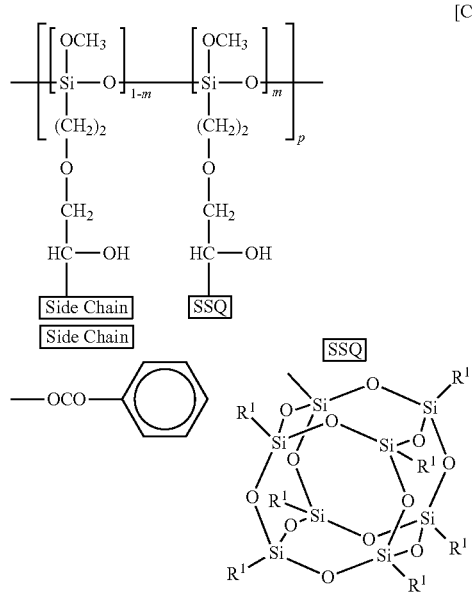

In the polysiloxane copolymer represented by the above formula, m was as follows.
(1) m=0.05 (Example 1)
(2) m=0.10 (Example 2)
(3) m=0.20 (Example 3)
(4) m=0.30 (Example 4)
(5) m=0.40 (Example 5)
(6) m=0.50 (Example 6)
(7) m=0 (Comparative Example 1)
(Production of Liquid Crystal Cell)

A substrate including an ITO (indium tin oxide) slit electrode and a substrate including no electrode were provided. An alignment agent obtained by blending the polysiloxane copolymer represented by the above formula and a polyamic acid-based polymer was applied to the substrates, and the workpiece was pre-baked at 90° C. for five minutes, followed by post-baking at 230° C. for 40 minutes. The surfaces of the substrates each provided with an alignment film were subjected to alignment treatment by rubbing. To one substrate (substrate including no electrode) was applied an ultraviolet-curable sealant (trade name: Photolec S-WB, Sekisui Chemical Co., Ltd.) in a predetermined pattern using a dispenser. Onto predetermined positions of the other substrate (substrate including an ITO slit electrode) were dropped a positive liquid crystal composition. The substrates were then attached to each other in a vacuum and the sealant was cured by ultraviolet light. In order to cancel the liquid crystal flow alignment, the liquid crystal cell was heated at 130° C. for 40 minutes and subjected to re-alignment treatment so that the liquid crystal was converted into an isotropic phase. Then, the liquid crystal cell was cooled down to room temperature, and thereby an IPS-mode liquid crystal cell was obtained. The response measurement of the obtained liquid crystal cell was carried out using Photal 5000 (Otsuka Electronics Co., Ltd) at 25° C.

(High-Temperature Test on Backlight)

In order to evaluate the heat resistance of the liquid crystal cell, the liquid crystal cell was left to stand for 200 hours (h) on a 75° C. backlight, and the voltage holding ratio (VHR) was determined before and after the test. The VHR was determined at 1 V and 70° C. using a VHR measurement system Model 6254 (Toyo Corp.). The contrast ratio was determined at 25° C. using Topcon UL-1. The results are shown in Table 1. Table 1 shows the response characteristics and the VHR before and after storage on the 75° C. backlight.

TABLE 1

| | Response characteristics (ms) | | VHR (%) | |
|---|---|---|---|---|
| | $\tau r$ | $\tau d$ | Initial VHR | After 200 h |
| m = 0.05 | 11.3 | 11.2 | 99.5 | 97.3 |
| m = 0.10 | 10.8 | 11.1 | 99.5 | 98.8 |
| m = 0.20 | 10.2 | 11.2 | 99.5 | 99.5 |
| m = 0.30 | 9.8 | 10.9 | 99.5 | 99.5 |
| m = 0.40 | 10.0 | 11.1 | 99.5 | 99.5 |
| m = 0.50 | 9.9 | 11.2 | 99.5 | 99.5 |
| m = 0 | 12.1 | 11.2 | 99.4 | 94.2 |

For the alignment film material containing the polysiloxane copolymer represented by the above formula, a study was made to examine the relation between the amount (m) of a silsesquioxane group introduced to a side chain and the response characteristics and the relation between the amount (m) and a VHR change with time.

With respect to the response characteristics, the study indicated that as m was increased, the rise response time (τr) decreased (the response became faster). In particular, τr decreased until m=0.3 and was nearly constant when m was 0.3 or greater. In contrast, τd was independent of m and nearly constant.

With respect to the VHR change in the storage test on the 75° C. backlight, a decrease in VHR was observed when m was 0.1 or smaller. This is presumably because of the dissolution of the polysiloxane copolymer, which is highly soluble in liquid crystal, into the liquid crystal layer in an environment of 75° C. and the ionization of a trace amount of ester groups due to cleavage. In contrast, no decrease in VHR occurred when m was 0.2 or greater. This is presumably because the SSQ group introduction reduced the solubility of the polysiloxane copolymer in liquid crystal.

Examples 7 to 12 and Comparative Example 2:
Horizontal Photo-Alignment/FFS Mode

A 15:85 (mass ratio) blended polymer of the following polymers was used as an alignment film material: a polysiloxane copolymer represented by the following formula containing a monomer unit having an SSQ group in a side chain and further containing a cinnamate group, which is a photo-aligning functional group, in a different monomer unit side chain ("Side Chain" in the following formula); and a polyamic acid-based polymer.

[Chem. 19]

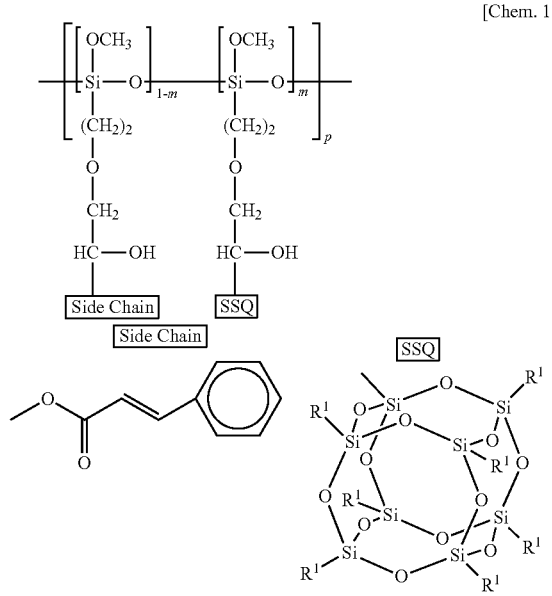

In the polysiloxane copolymer represented by the above formula, m was as follows.
(1) m=0.05 (Example 7)
(2) m=0.10 (Example 8)
(3) m=0.20 (Example 9)
(4) m=0.30 (Example 10)
(5) m=0.40 (Example 11)
(6) m=0.50 (Example 12)
(7) m=0 (Comparative Example 2)
(Production of Liquid Crystal Cell)

A substrate including an ITO slit electrode and a substrate including no electrode were provided. An alignment agent obtained by blending the polysiloxane copolymer represented by the above formula and a polyamic acid-based polymer was applied to the substrates, and the workpiece was pre-baked at 90° C. for five minutes, followed by post-baking at 230° C. for 40 minutes. The surfaces of the substrates each provided with an alignment film were subjected to alignment treatment by irradiation with polarized ultraviolet light. To one substrate (substrate including no electrode) was applied an ultraviolet-curable sealant (trade name: Photolec S-WB, Sekisui Chemical Co., Ltd.) in a predetermined pattern using a dispenser. Onto predetermined positions of the other substrate (substrate including an ITO slit electrode) was dropped a negative liquid crystal composition. The substrates were then attached to each other in a vacuum and the sealant was cured by ultraviolet light. In order to cancel the liquid crystal flow alignment, the liquid crystal cell was heated at 130° C. for 40 minutes and subjected to re-alignment treatment so that the liquid crystal was converted into an isotropic phase. Then, the liquid crystal cell was cooled down to room temperature, and thereby an FFS-mode liquid crystal cell was obtained. The response measurement of the obtained liquid crystal cell was carried out as in Example 1.
(High-Temperature Test on Backlight)

The test was performed as in Example 1. The results are shown in Table 2. Table 2 shows the response characteristics and the VHR before and after storage (200 h) on the 75° C. backlight.

TABLE 2

| | Response characteristics (ms) | | VHR (%) | |
|---|---|---|---|---|
| | τr | τd | Initial VHR | After 200 h |
| m = 0.05 | 25.1 | 24.9 | 99.5 | 86.0 |
| m = 0.10 | 23.8 | 24.6 | 99.5 | 89.6 |
| m = 0.20 | 23.4 | 25.2 | 99.5 | 90.9 |
| m = 0.30 | 22.3 | 24.5 | 99.5 | 95.1 |
| m = 0.40 | 22.1 | 24.7 | 99.5 | 98.7 |
| m = 0.50 | 21.7 | 24.1 | 99.5 | 99.5 |
| m = 0 | 27.0 | 24.2 | 99.4 | 72.7 |

For the alignment film material containing the polysiloxane copolymer of a monomer unit having an SSQ group in a side chain and a monomer unit having a photo-aligning functional group (cinnamate group) represented by the above formula, a study was made to examine the relation between the amount (m) of a silsesquioxane group introduced to a side chain and the response characteristics and the relation between the amount (m) and a VHR change with time.

With respect to the response characteristics, as in Example 1, the study indicated that as m was increased, the rise response time (τr) decreased (the response became faster). In particular, τr decreased until m=0.3 and was nearly constant when m was 0.3 or greater. In contrast, τd was independent of m and nearly constant.

With respect to the VHR change in the storage test on the 75° C. backlight, a relatively large change in VHR was observed when m was 0.2 or smaller. This is presumably because of the dissolution of the polysiloxane copolymer, which is highly soluble in liquid crystal, into the liquid crystal layer in an environment of 75° C. and the conversion of the ester and cinnamate groups into radicals due to cleavage. In contrast, the decrease in VHR was significantly reduced when m was 0.3 or greater. This is presumably because the SSQ group introduction reduced the solubility of the polysiloxane copolymer in liquid crystal.

Examples 13 to 18 and Comparative Example 3:
Horizontal Photo-Alignment

A 10:90 (mass ratio) blended polymer of the following polymers was used as an alignment film material: a polyvinyl copolymer represented by the following formula containing a monomer unit having an SSQ group in a side chain and further containing a cinnamate group, which is a photo-aligning functional group, in a different monomer unit side chain ("Side Chain" in the following formula); and a polyamic acid-based polymer.

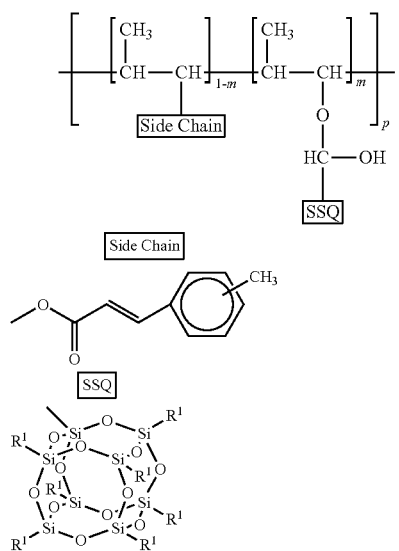

[Chem. 20]

In the polyvinyl copolymer represented by the above formula, m was as follows.

(1) m=0.05 (Example 13)
(2) m=0.10 (Example 14)
(3) m=0.20 (Example 15)
(4) m=0.30 (Example 16)
(5) m=0.40 (Example 17)
(6) m=0.50 (Example 18)
(7) m=0 (Comparative Example 3)

(Production of Liquid Crystal Cell)

A substrate including an ITO slit electrode and a substrate including no electrode were provided. An alignment agent obtained by blending the polyvinyl copolymer represented by the above formula and a polyamic acid-based polymer was applied to the substrates, and the workpiece was pre-baked at 90° C. for five minutes, followed by post-baking at 230° C. for 40 minutes. The surfaces of the substrates each provided with an alignment film were subjected to alignment treatment by irradiation with polarized ultraviolet light. To one substrate (substrate including no electrode) was applied an ultraviolet-curable sealant (trade name: Photolec S-WB, Sekisui Chemical Co., Ltd.) in a predetermined pattern using a dispenser. Onto predetermined positions of the other substrate (substrate including an ITO slit electrode) were dropped a positive liquid crystal composition. The substrates were then attached to each other in a vacuum and the sealant was cured by ultraviolet light. In order to cancel the liquid crystal flow alignment, the liquid crystal cell was heated at 130° C. for 40 minutes and subjected to re-alignment treatment so that the liquid crystal was converted into an isotropic phase. Then, the liquid crystal cell was cooled down to room temperature, and thereby an FFS-mode liquid crystal cell was obtained. The response measurement of the obtained liquid crystal cell was carried out as in Example 1.

(High-Temperature Test on Backlight)

The test was performed as in Example 1. The results are shown in Table 3. Table 3 shows the response characteristics and the VHR before and after storage (200 h) on the 75° C. backlight.

TABLE 3

| | Response characteristics (ms) | | VHR (%) | |
|---|---|---|---|---|
| | τr | τd | Initial VHR | After 200 h |
| m = 0.05 | 12.8 | 13.7 | 99.2 | 97.0 |
| m = 0.10 | 12.0 | 13.2 | 99.5 | 98.1 |
| m = 0.20 | 11.4 | 13.4 | 99.5 | 98.9 |
| m = 0.30 | 11.1 | 13.1 | 99.5 | 99.3 |
| m = 0.40 | 11.1 | 13.3 | 99.5 | 99.4 |
| m = 0.50 | 10.7 | 13.4 | 99.5 | 99.4 |
| m = 0 | 13.2 | 13.6 | 99.1 | 92.1 |

For the alignment film material containing the polyvinyl copolymer represented by the above formula, a study was made to examine the relation between the amount (m) of an SSQ group introduced to a side chain and the response characteristics and the relation between the amount (m) and a VHR change with time.

With respect to the response characteristics, the study indicated that as m was increased, the rise response time (τr) decreased (the response became faster). In particular, τr decreased until m=0.2 and was nearly constant when m was 0.2 or greater. In contrast, τd was independent of m and nearly constant.

With respect to the VHR change in the storage test on the 75° C. backlight, a decrease in VHR was observed when m was 0.2 or smaller. This is presumably because of the dissolution of the polyvinyl copolymer, which is highly soluble in liquid crystal, into the liquid crystal layer in an environment of 75° C. and the conversion of the cinnamate and ester groups into radicals due to cleavage. In contrast, the decrease in VHR was reduced when m was 0.3 or greater. This is presumably because the SSQ group introduction reduced the solubility of the polyvinyl copolymer in liquid crystal.

Examples 19 to 24 and Comparative Example 4: Vertical Photo-Alignment

A 8:92 (mass ratio) blended polymer of the following polymers was used as an alignment film material: a polysiloxane copolymer for vertical alignment represented by the following formula containing a monomer unit having an SSQ group in a side chain and further containing a cinnamate group, which is a photo-aligning functional group, in a different monomer unit side chain ("Side Chain" in the following formula); and a polyamic acid-based polymer.

[Chem. 21]

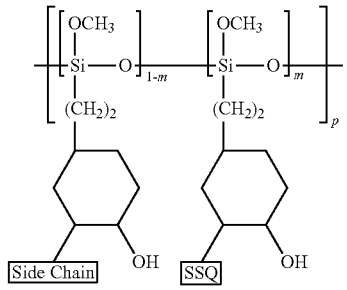

-continued

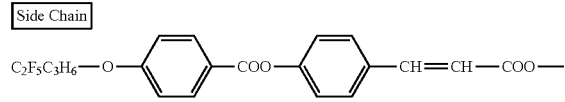

and

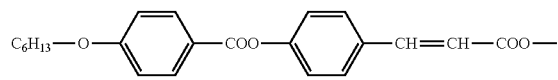

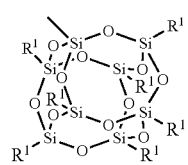

In the polysiloxane copolymer represented by the above formula, m was as follows.

(1) m=0.05 (Example 19)
(2) m=0.10 (Example 20)
(3) m=0.20 (Example 21)
(4) m=0.30 (Example 22)
(5) m=0.40 (Example 23)
(6) m=0.50 (Example 24)
(7) m=0 (Comparative Example 4)

(Production of Liquid Crystal Cell)

A pair of substrates, each including an ITO slit electrode, was provided. An alignment agent obtained by blending the polysiloxane copolymer for vertical alignment represented by the above formula and a polyamic acid-based polymer was applied to the substrates including an ITO slit electrode, and the workpiece was pre-baked at 90° C. for five minutes, followed by post-baking at 230° C. for 40 minutes. The surfaces of the substrates each provided with an alignment film were subjected to alignment treatment by irradiation with polarized ultraviolet light. To one substrate was applied an ultraviolet-curable sealant (trade name: Photolec S-WB, Sekisui Chemical Co., Ltd.) in a predetermined pattern using a dispenser. Onto predetermined positions of the other substrate was dropped a negative liquid crystal composition. The substrates were then attached to each other in a vacuum and the sealant was cured by ultraviolet light. In order to cancel the liquid crystal flow alignment, the liquid crystal cell was heated at 130° C. for 40 minutes and subjected to re-alignment treatment so that the liquid crystal was converted into an isotropic phase. Then, the liquid crystal cell was cooled down to room temperature, and thereby a VA-mode liquid crystal cell was obtained. The response measurement of the obtained liquid crystal cell was carried out as in Example 1.

(High-Temperature Test on Backlight)

The test was performed as in Example 1.

(Tilt-Angle Change (Δtilt) Measurement)

The liquid cell was energized at 10 V for 200 hours. The tilt-angle change (Δtilt) before and after energization was determined by the crystal rotation method. The results are shown in Table 4. Table 4 further shows the response characteristics and the VHR before and after storage on the 75° C. backlight.

TABLE 4

| | Response characteristics (ms) | | VHR (%) | | |
|---|---|---|---|---|---|
| | τr | τd | Initial VHR | After 200 h | ΔTilt (°) |
| m = 0.05 | 35.7 | 13.3 | 99.5 | 91.3 | 0.35 |
| m = 0.10 | 28.4 | 13.2 | 99.5 | 94.2 | 0.30 |
| m = 0.20 | 25.5 | 13.3 | 99.5 | 97.9 | 0.30 |
| m = 0.30 | 23.9 | 12.9 | 99.5 | 98.3 | 0.30 |
| m = 0.40 | 23.3 | 13.0 | 99.5 | 98.3 | 0.25 |
| m = 0.50 | 23.6 | 13.0 | 99.5 | 98.4 | 0.25 |
| m = 0 | 54.1 | 14.1 | 99.5 | 86.8 | 0.65 |

For the alignment film material containing the polysiloxane copolymer of a monomer unit having an SSQ group in a side chain and a monomer unit having a vertical alignment functional group (cinnamate group) represented by the above formula, a study was made to examine the relation between the amount (m) of a silsesquioxane group introduced to a side chain and the response characteristics and the relation between the amount (m) and a VHR change with time.

With respect to the response characteristics, as in Examples 1 to 6, the study indicated that as m was increased, the rise response time (τr) decreased (the response became faster). In particular, τr decreased until m=0.2 and was nearly constant when m was 0.2 or greater. In contrast, τd was independent of m and nearly constant.

With respect to the VHR change in the storage test on the 75° C. backlight, a significant decrease in VHR was observed when m was 0.1 or smaller. This is presumably because of the dissolution of the polysiloxane copolymer, which is highly soluble in liquid crystal, into the liquid crystal layer in an environment of 75° C. and the conversion of the cinnamate and ester groups into radicals due to cleavage. In contrast, the decrease in VHR was significantly reduced when m was 0.2 or greater. This is presumably because the SSQ group introduction reduced the solubility of the polysiloxane copolymer in liquid crystal.

The tilt-angle change (Δtilt) by energization also decreased with an increase in the amount of an SSQ introduced, confirming the effect of the SSQ group introduction.

Comparative Example 5: Vertical Photo-Alignment

A 8:92 (mass ratio) blended polymer of the following polymers was used as an alignment film material: a vertical alignment polysiloxane copolymer represented by the formula of Examples 19 to 24 containing a monomer unit having an SSQ group in a side chain and further containing a cinnamate group, which is a photo-aligning functional group, in a different monomer unit side chain ("Side Chain" in the above formula); and a polyamic acid-based polymer. In the polysiloxane copolymer represented by the formula of Examples 19 to 24, m was as follows.

m=0.40 (Example 23)

A 15:85 (mass ratio) blended polymer of the following polymers was used as an alignment film material: a vertical alignment polyamic acid (polyimide) copolymer containing a monomer unit having an SSQ group in a side chain and further containing a cinnamate group, which is a photo-aligning functional group, in a different monomer unit side chain ("Side Chain" in the following formula); and a polyamic acid-based polymer different from the polyamic acid copolymer.

[Chem. 22]

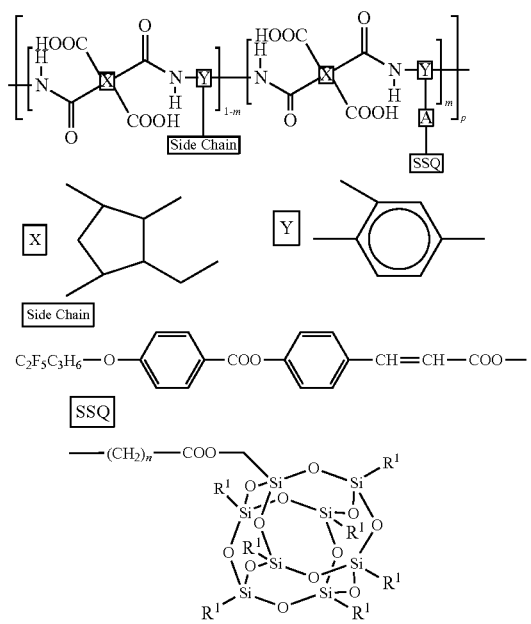

In the polyamic acid copolymer represented the above formula, m was as follows.
m=0.4 (Comparative Example 5)
(Production of Liquid Crystal Cell)

A pair of substrates, each including an ITO slit electrode, was provided. To the substrates including an ITO electrode was applied an alignment agent obtained by blending the polysiloxane copolymer for vertical alignment represented by the formula of Examples 19 to 24 and a polyamic acid-based polymer or another alignment agent obtained by blending the polyamic acid copolymer for vertical alignment represented by the above formula and a polyamic acid-based polymer. The workpiece was pre-baked at 90° C. for five minutes, followed by post-baking at 230° C. for 40 minutes. The surfaces of the substrates each provided with an alignment film were subjected to alignment treatment by irradiation with polarized ultraviolet light. To one substrate was applied an ultraviolet-curable sealant (trade name: Photolec S-WB, Sekisui Chemical Co., Ltd.) in a predetermined pattern using a dispenser. Onto predetermined positions of the other substrate was dropped a negative liquid crystal composition. The substrates were then attached to each other in a vacuum and the sealant was cured by ultraviolet light. In order to cancel the liquid crystal flow alignment, the liquid crystal cell was heated at 130° C. for 40 minutes and subjected to re-alignment treatment so that the liquid crystal was converted into an isotropic phase. Then, the liquid crystal cell was cooled down to room temperature, and thereby a VA-mode liquid crystal cell was obtained. The response and contrast ratio of the obtained liquid crystal cell were measured.
(High-Temperature Test on Backlight)

The test was performed as in Example 1.
(Tilt-Angle Change (Δtilt) Measurement)

The liquid crystal cell was energized at 10 V for 200 hours. The tilt-angle change (tilt) before and after energization was determined by the crystal rotation method.
(Contrast Ratio)

The contrast ratio was measured with a contrast characteristics evaluating device available from Topcon Corporation.

The results of the respective measurements are shown in Table 5. Table 5 shows comparison of the response characteristics, the VHRs before and after the storage (200 h) on the 75° C. backlight, and the initial contrast ratios.

TABLE 5

| | Response characteristics (ms) | | VHR (%) | | Initial contrast ratio |
|---|---|---|---|---|---|
| | τr | τd | Initial VHR | After 200 h | |
| Polysiloxane m = 0.40 | 23.3 | 13.0 | 99.5 | 98.3 | 5300 |
| Polyamic acid m = 0.40 | 23.9 | 12.9 | 99.5 | 98.7 | 4650 |

No difference was found in the results of the response characteristics measurement and the storage test on the 75° C. backlight when a comparison was made between the results obtained using the alignment film material containing the polysiloxane copolymer represented by the formula of Examples 19 to 24, containing a monomer unit having an SSQ group at a side chain and a monomer unit having a vertically aligning, photo-aligning functional group (cinnamate group) and the results obtained using the alignment film material containing the polyamic acid copolymer represented by the above formula, containing a monomer unit having an SSQ group in a side chain and a monomer unit having a vertically aligning functional group (cinnamate group). The contrast ratio obtained using a polyamic acid, however, was slightly lower. This is presumably because the alignment control (tilt variation control) with an alignment film including a polyamic acid is harder than with an alignment film including a polysiloxane.

The aforementioned liquid crystal display devices of the respective examples may also be applied to production of liquid crystal display devices of a different mode, such as an ECB mode, a TN mode, or a vertical alignment TN (VAIN) mode.
[Additional Remarks]

Examples of preferred aspects of the alignment film, polymer and liquid crystal display device of the present invention will be listed below. The preferred examples described below, as well as the preferred examples described above, are examples of preferred aspects of the present invention. These examples may be appropriately combined without departing from the gist of the present invention.

One aspect of the present invention may be an alignment film including: a polymer, wherein the polymer is a polysiloxane or a polyvinyl and contains a silsesquioxane group.

In the alignment film of the present invention, the polymer preferably further contains an ester group. The present invention can sufficiently prevent display stains and image sticking even with the polymer containing an ester group.

In the alignment film of the present invention, the silsesquioxane group is preferably a group represented by the following formula (I) or (II):

[Chem. 23]

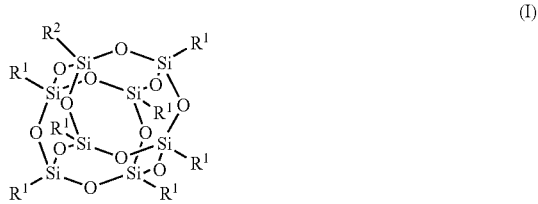

(I)

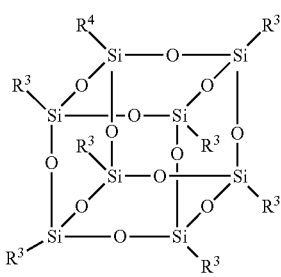

wherein R$^1$s are the same as or different from each other and each a monovalent organic group; R$^2$ is a direct bond or a divalent linking group; R$^3$s are the same as or different from each other and each a monovalent organic group; and R$^4$ is a direct bond or a divalent linking group R$^1$s are the same as or different from each other and preferably each an alkyl group, an alkenyl group, a substituted or unsubstituted aryl group, a substituted or unsubstituted arylalkyl group, a substituted or unsubstituted arylalkenyl group, or a substituted or unsubstituted phenyl group. In the alkyl group, the alkenyl group, the alkylene group in the arylalkyl group, the alkenylene group in the arylalkenyl group, and the phenyl group, one or more hydrogen atoms may be replaced with a fluorine atom, and one or more —CH$_2$— may be replaced with —O—.

In the alignment film of the present invention, R$^2$ and R$^4$ are each preferably any of the following formulae (III) to (XI).

[Chem. 24]

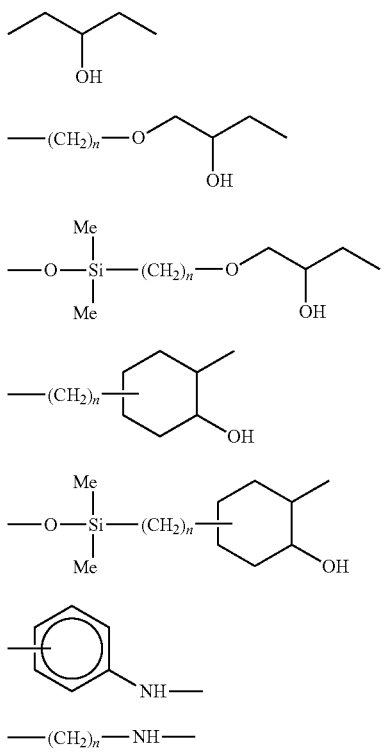

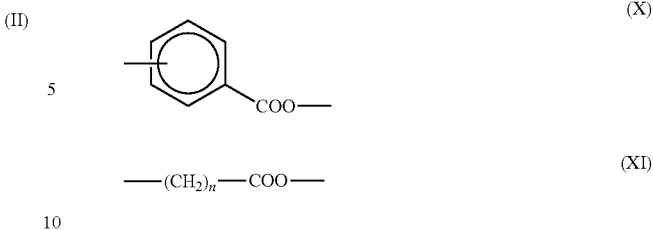

wherein n is an integer of 1 to 16; and Me is a methyl group.

In the alignment film of the present invention, the polymer preferably further contains a photo-aligning functional group or a vertically or horizontally aligning group other than the photo-aligning functional group. For example, the polymer preferably further contains a photo-aligning functional group. The photo-aligning functional group is more preferably at least one selected from the group consisting of a cinnamate group, an azobenzene group, a chalcone group, a coumarin group, a stilbene group, and a tolane group.

In the alignment film of the present invention, the polymer is preferably a polysiloxane including a structure represented by the following formula (i) or formula (ii):

[Chem. 25]

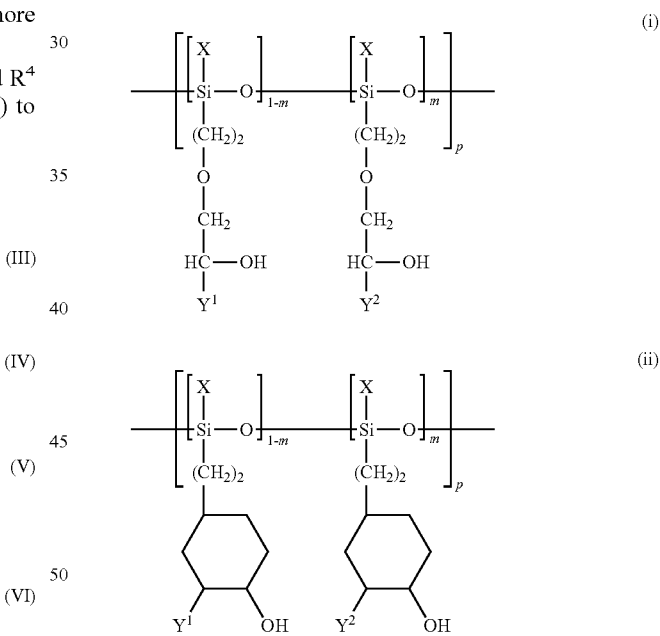

wherein Xs are the same as or different from each other and each a hydrogen atom, a methyl group, a methoxy group, an ethoxy group, or a hydroxy group; m is greater than 0 and not greater than 1; p represents the degree of polymerization and is an integer of 1 or greater; Y$^1$s are the same as or different from each other and each a photo-aligning functional group or a vertically or horizontally aligning group other than the photo-aligning functional group; and Y$^2$ is a functional group having a silsesquioxane group.

In the alignment film of the present invention, the polymer is preferably a polysiloxane including a structure represented by the following formula (iii):

[Chem. 26]

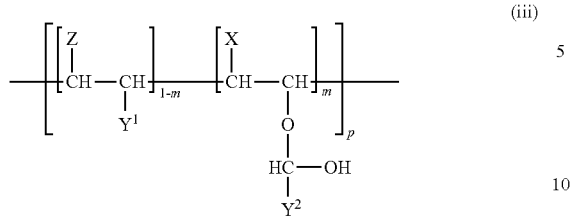
(iii)

wherein Zs are the same as or different from each other and each a hydrogen atom, a methyl group, or an ethyl group; m is greater than 0 and not greater than 1; p represents the degree of polymerization and is an integer of 1 or greater; $Y^1$s are the same as or different from each other and each a photo-aligning functional group or a vertically or horizontally aligning group other than the photo-aligning functional group; and $Y^2$ is a functional group having a silsesquioxane group.

In the alignment film of the present invention, the polymer preferably contains a vertically aligning group. In the alignment film of the present invention, the polymer preferably contains a horizontally aligning group.

Another aspect of the present invention is a polymer for use in the alignment film of the present invention, the polymer containing a silsesquioxane group.

Still another aspect of the present invention may be the use of a polymer containing a silsesquioxane group as a polymer to constitute an alignment film.

Still another aspect of the present invention is a liquid crystal display device including: the alignment film of the present invention; a pair of substrates; and a liquid crystal layer disposed between the substrates, wherein the alignment film is disposed between at least one of the substrates and the liquid crystal layer.

The display mode of the liquid crystal display device of the present invention is preferably the twisted nematic (TN) mode, the electrically controlled birefringence (ECB) mode, the IPS mode, the FFS mode, the VA mode, or the VATN mode. The liquid crystal display device of the present invention may be a transmissive, reflective, or transflective liquid crystal display device. When the liquid crystal display device of the present invention is a transmissive or transflective liquid crystal display device, the liquid crystal display device of the present invention typically includes a backlight.

REFERENCE SIGNS LIST

11: Lower glass substrate
13, 23, 113: Alignment film
21: Upper glass substrate
31, 131: Liquid crystal layer
33: Seal
41: Backlight

The invention claimed is:
1. An alignment film for aligning liquid crystal molecules comprising:
a polymer,
wherein the polymer is a polysiloxane and comprises a silsesquioxane group, wherein the silsesquioxane group is a group represented by the following formula (I):

[Chem. 1]

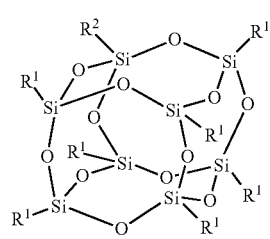
(I)

wherein $R^1$s are the same as or different from each other and each is a monovalent organic group and $R^2$ is any one of formulae (III) to (XI):

[Chem. 2]

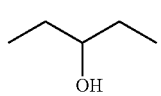
(III)

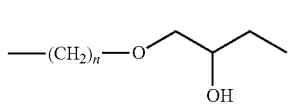
(IV)

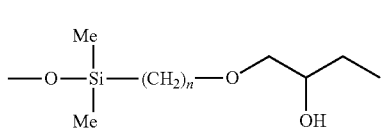
(V)

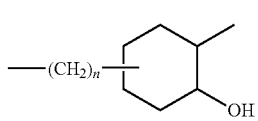
(VI)

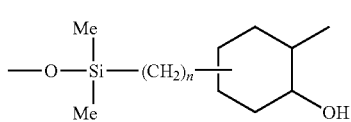
(VII)

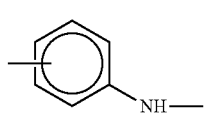
(VIII)

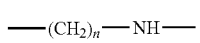
(IX)

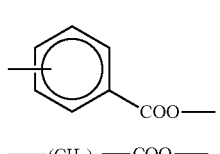
(X)

(XI)

wherein n is an integer of 1 to 16; and Me is a methyl group, wherein the polymer further comprises an ester group,
wherein the polymer is a polysiloxane copolymer represented by the following formula containing a monomer unit:

[Chem. 3]

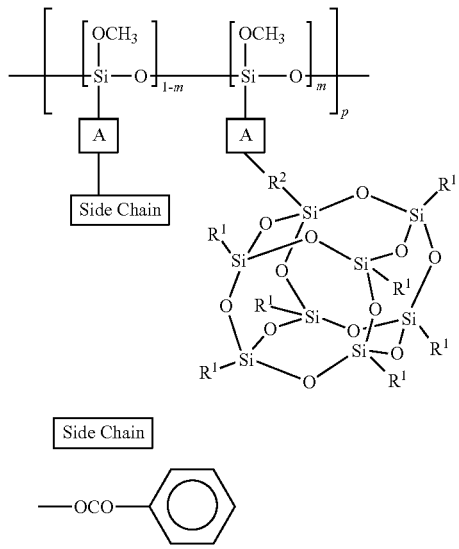

wherein A's are the same as or different from each other and each is a direct bond or a divalent organic group,
wherein m is greater than 0 and p is greater than 1.

2. The alignment film according to claim 1,
wherein the polymer further contains a photo-aligning functional group.

3. The alignment film according to claim 2,
wherein the photo-aligning functional group is at least one selected from the group consisting of a cinnamate group, an azobenzene group, a chalcone group, a coumarin group, a stilbene group, and a tolane group.

4. A liquid crystal display device comprising:
the alignment film according to claim 1;
a pair of substrates; and
a liquid crystal layer disposed between the substrates,
wherein the alignment film is disposed between at least one of the substrates and the liquid crystal layer.

5. An alignment film for aligning liquid crystal molecules comprising:
a polymer,
wherein the polymer is a polysiloxane and comprises a silsesquioxane group, wherein the silsesquioxane group is a group represented by the following formula (I):

[Chem. 4]

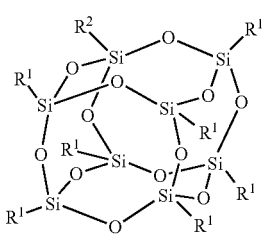

wherein $R^1$s are the same as or different from each other and each is a monovalent organic group and $R^2$ is any one of formulae (III) to (XI):

[Chem. 5]

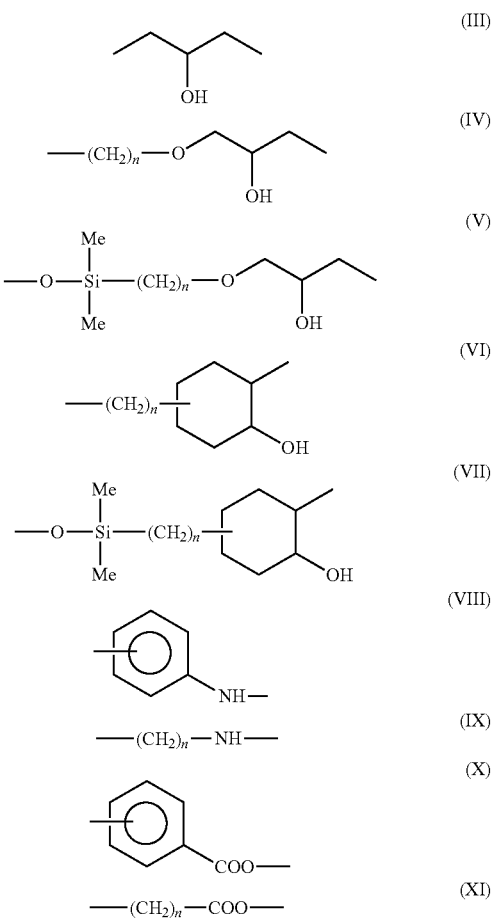

wherein n is an integer of 1 to 16; and Me is a methyl group,
wherein the polymer further comprises an ester group,
wherein the polymer is a polysiloxane copolymer represented by the following formula containing a monomer unit:

[Chem. 6]

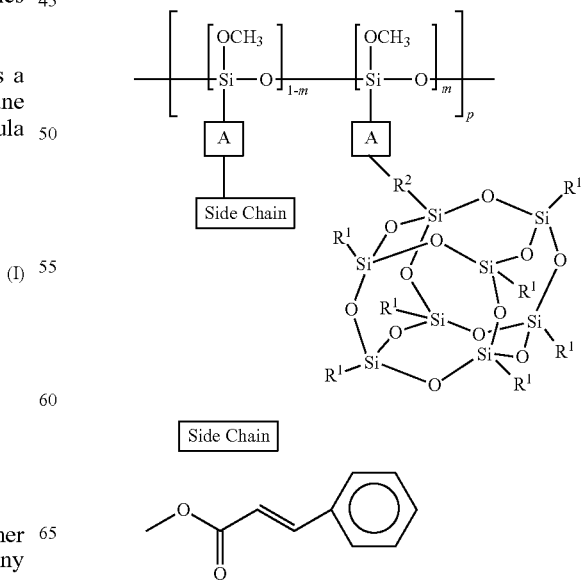

wherein A's are the same as or different from each other and each is a direct bond or a divalent organic group,
wherein m is greater than 0 and p is greater than 1.

6. The alignment film according to claim 2,
wherein the polymer further contains a photo-aligning functional group.

7. The alignment film according to claim 6,
wherein the photo-aligning functional group is at least one selected from the group consisting of a cinnamate group, an azobenzene group, a chalcone group, a coumarin group, a stilbene group, and a tolane group.

8. A liquid crystal display device comprising:
the alignment film according to claim 5;
a pair of substrates; and
a liquid crystal layer disposed between the substrates,
wherein the alignment film is disposed between at least one of the substrates and the liquid crystal layer.

9. An alignment film for aligning liquid crystal molecules comprising:
a polymer,
wherein the polymer is a polyvinyl and comprises a silsesquioxane group, wherein the silsesquioxane group is a group represented by the following formula (I):

[Chem. 7]

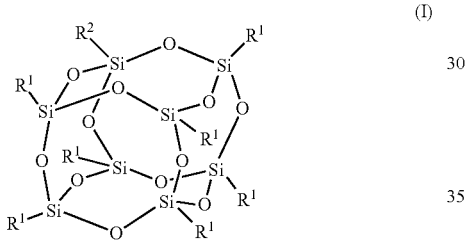
(I)

wherein R¹s are the same as or different from each other and each is a monovalent organic group and R² is any one of formulae (III) to (XI):

[Chem. 8]

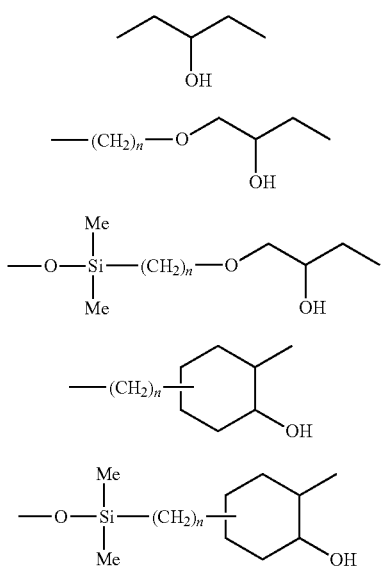

(III)
(IV)
(V)
(VI)
(VII)

-continued

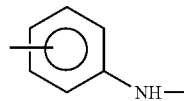
(XIII)

—(CH$_2$)$_n$—NH— (IX)

(X)

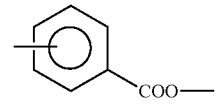

—(CH$_2$)$_n$—COO— (XI)

wherein n is an integer of 1 to 16; and Me is a methyl group,
wherein the polymer further comprises an ester group,
wherein the polymer is a polyvinyl copolymer represented by the following formula containing a monomer unit:

[Chem. 9]

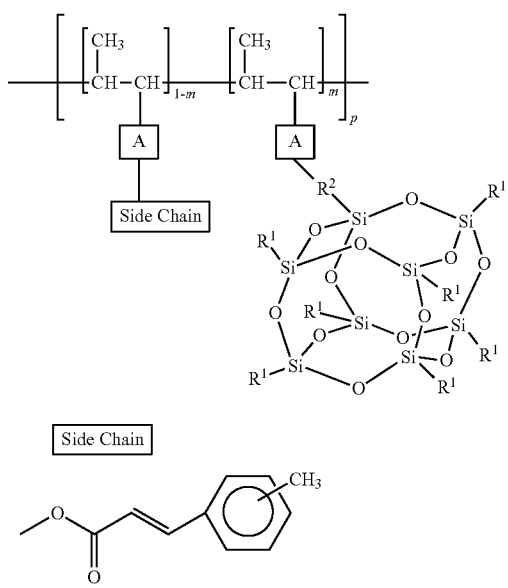

wherein A's are the same as or different from each other and each is a direct bond or a divalent organic group,
wherein m is greater than 0 and p is greater than 1.

10. The alignment film according to claim 9,
wherein the polymer further contains a photo-aligning functional group.

11. The alignment film according to claim 10,
wherein the photo-aligning functional group is at least one selected from the group consisting of a cinnamate group, an azobenzene group, a chalcone group, a coumarin group, a stilbene group, and a tolane group.

12. A liquid crystal display device comprising:
the alignment film according to claim 9;
a pair of substrates; and
a liquid crystal layer disposed between the substrates,
wherein the alignment film is disposed between at least one of the substrates and the liquid crystal layer.

13. An alignment film for aligning liquid crystal molecules comprising:
a polymer,
wherein the polymer is a polysiloxane and comprises a silsesquioxane group, wherein the silsesquioxane group is a group represented by the following formula (I):

[Chem. 10]

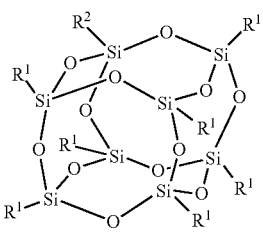

(I)

wherein R¹s are the same as or different from each other and each is a monovalent organic group and R² is any one of formulae (III) to (XI):

[Chem. 11]

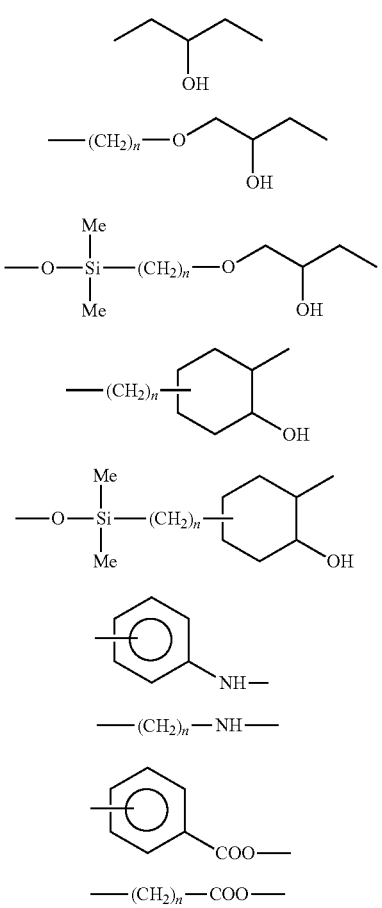

(III)
(IV)
(V)
(VI)
(VII)
(VIII)
(IX)
(X)
(XI)

wherein n is an integer of 1 to 16; and Me is a methyl group, wherein the polymer further comprises an ester group, wherein the polymer is a polysiloxane copolymer represented by the following formula containing a monomer unit:

[Chem. 12]

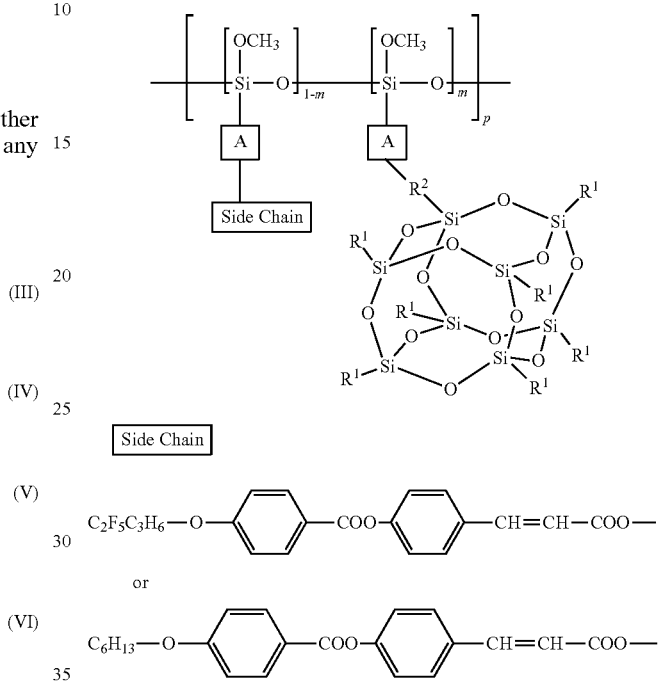

wherein A's are the same as or different from each other and each is a direct bond or a divalent organic group, wherein m is greater than 0 and p is greater than 1.

14. The alignment film according to claim 13, wherein the polymer further contains a photo-aligning functional group.

15. The alignment film according to claim 14, wherein the photo-aligning functional group is at least one selected from the group consisting of a cinnamate group, an azobenzene group, a chalcone group, a coumarin group, a stilbene group, and a tolane group.

16. A liquid crystal display device comprising:
the alignment film according to claim 13;
a pair of substrates; and
a liquid crystal layer disposed between the substrates,
wherein the alignment film is disposed between at least one of the substrates and the liquid crystal layer.

* * * * *